United States Patent
Nakagawa

(10) Patent No.: US 11,010,045 B2
(45) Date of Patent: May 18, 2021

(54) CONTROL APPARATUS, CONTROL METHOD, AND NON-TRANSITORY COMPUTER READABLE MEDIUM

(71) Applicant: CANON KABUSHIKI KAISHA, Tokyo (JP)

(72) Inventor: Koichi Nakagawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/423,519

(22) Filed: May 28, 2019

(65) Prior Publication Data

US 2019/0369831 A1 Dec. 5, 2019

(30) Foreign Application Priority Data

May 31, 2018 (JP) .............................. JP2018-104635

(51) Int. Cl.
*G06F 3/0488* (2013.01)
*G06F 3/044* (2006.01)
*H04N 5/232* (2006.01)
*G06F 3/041* (2006.01)

(52) U.S. Cl.
CPC ............ *G06F 3/0488* (2013.01); *G06F 3/044* (2013.01); *G06F 3/0416* (2013.01); *H04N 5/232933* (2018.08)

(58) Field of Classification Search
CPC ...... G06F 3/0488; G06F 3/044; G06F 3/0416; G06F 3/0485; H04N 5/232933
See application file for complete search history.

(56) References Cited

U.S. PATENT DOCUMENTS

| | | | | |
|---|---|---|---|---|
| 2007/0005817 A1* | 1/2007 | Kwak | ................. | G06F 3/03543 710/3 |
| 2007/0008293 A1* | 1/2007 | Oldrey | ................ | G06F 3/04895 345/173 |
| 2010/0060597 A1* | 3/2010 | Choi | .................... | G06F 3/04886 345/173 |
| 2011/0179368 A1* | 7/2011 | King | ................... | G06F 3/04815 715/769 |
| 2012/0235938 A1* | 9/2012 | Laubach | ............. | G06F 3/04883 345/173 |

(Continued)

FOREIGN PATENT DOCUMENTS

JP 2010257046 A 11/2010

*Primary Examiner* — Ibrahim A Khan
(74) *Attorney, Agent, or Firm* — Rossi, Kimms & McDowell LLP

(57) ABSTRACT

A control apparatus externally connected with a display apparatus having a touch panel, the control apparatus includes: a first receiving unit configured to receive panel information related to a touch detection method used in the touch panel from the display apparatus; a second receiving unit configured to receive a predetermined operation to the touch panel from the display apparatus; and a user interface (UI) control unit configured to control a UI used for (1) displaying an item on the display device, (2) detecting the predetermined operation to the item, and (3) accepting a predetermined instruction corresponding to the detection result, wherein the UI control unit is further configured to carry out display control for the item or detection control for the predetermined operation to the item on the basis of the panel information.

13 Claims, 14 Drawing Sheets

(56) References Cited

U.S. PATENT DOCUMENTS

| | | | |
|---|---|---|---|
| 2013/0097550 A1* | 4/2013 | Grossman | G06F 3/0488 |
| | | | 715/779 |
| 2013/0106801 A1* | 5/2013 | Kawai | G06F 3/033 |
| | | | 345/179 |
| 2013/0177891 A1* | 7/2013 | Hammerschmidt | G09B 5/06 |
| | | | 434/309 |
| 2013/0314377 A1* | 11/2013 | Los | G06F 3/0308 |
| | | | 345/175 |
| 2014/0040831 A1* | 2/2014 | Akasaka | G06F 3/04883 |
| | | | 715/841 |
| 2015/0363585 A1* | 12/2015 | Gooding | G06K 9/00026 |
| | | | 726/19 |
| 2017/0244943 A1* | 8/2017 | Saito | G06F 3/04845 |
| 2017/0371492 A1* | 12/2017 | Chen | G06F 3/14 |
| 2018/0046285 A1* | 2/2018 | Lee | G06F 3/0443 |

* cited by examiner

CONTROL APPARATUS, CONTROL METHOD, AND NON-TRANSITORY COMPUTER READABLE MEDIUM

BACKGROUND OF THE INVENTION

Field of the Invention

The present invention relates to a control apparatus, a control method, and a non-transitory computer readable medium.

Description of the Related Art

Currently, equipment which can be operated using a touch panel has been widely available. One of touch detection methods for the touch panel is a capacitive type method. According to the capacitive type method, whether a user's finger is close to or in contact with an electrode is detected using a differential value between reference capacitance (a base line value) as a capacitance value while neither of the finger and a dielectric is in contact with the electrode and a capacitance value output from the electrode (Japanese Patent Application Publication No. 2010-257046).

Touch panel structures for implementing the capacitive type method are roughly divided into two kinds. One is a two-layer type capacitive touch panel which has a sensor layer for detecting capacitance including two layers, and the other is a one-layer type capacitive touch panel having a single sensor layer. The two-layer type touch panel allows a complex sensor pattern to be implemented, and therefore highly accurate position detection is enabled, while the cost for producing the touch panel is high. The single-layer touch panel allows only a simple sensor pattern to be implemented, and therefore the number of sensors contacted by the fingers or the like at ends of the touch panel is small, and the accuracy for position detection is lower, while the cost for producing the touch panel is reduced. In this way, the two-layer and single-layer panels both have advantages and disadvantages, and therefore both kinds of panels are available as capacitive touch panels.

SUMMARY OF THE INVENTION

Here, equipment to which a plurality of touch panel units can be connected may be connected with both two-layer touch panel and single-layer capacitive touch panels (touch panel units). However, when a user interface (UI) based on the use of a two-layer capacitive touch panel is used to a single-layer capacitive touch panel, it is highly likely that a user's operation is erroneously detected (especially at ends). Meanwhile, when a UI based on the use of a single-layer capacitive touch panel is used to a two-layer capacitive touch panel, the high position detection accuracy by the two-layer capacitive touch panel cannot be fully utilized.

Therefore, it is an object of the present invention to provide a highly convenient UI for use in a touch panel.

The present invention in its first aspect provides a control apparatus comprising:

a control apparatus externally connected with a display apparatus having a touch panel, the control apparatus comprising:

a first receiving unit configured to receive panel information related to a touch detection method used in the touch panel from the display apparatus;

a second receiving unit configured to receive a predetermined operation to the touch panel from the display apparatus; and a user interface (UI) control unit configured to control a UI used for (1) displaying an item on the display device, (2) detecting the predetermined operation to the item, and (3) accepting a predetermined instruction corresponding to the detection result, wherein the UI control unit is further configured to carry out display control for the item or detection control for the predetermined operation to the item on the basis of the panel information.

The present invention in its second aspect provides a control method of control apparatus externally connected with a display apparatus having a touch panel, the control method comprising:

receiving panel information related to a touch detection method used in the touch panel from the display apparatus;

receiving a predetermined operation to the touch panel from the display apparatus; and controlling a UI used for (1) displaying an item on the display device, (2) detecting the predetermined operation to the item, and (3) accepting a predetermined instruction corresponding to the detection result, carrying out display control for the item or detection control for the predetermined operation to the item on the basis of the panel information.

The present invention in its third aspect provides a non-transitory computer readable medium that stores a program, wherein the program causes a computer to execute: a control method of control apparatus externally connected with a display apparatus having a touch panel, the control method comprising:

receiving panel information related to a touch detection method used in the touch panel from the display apparatus;

receiving a predetermined operation to the touch panel from the display apparatus;

controlling a UI used for (1) displaying an item on the display device, (2) detecting the predetermined operation to the item, and (3) accepting a predetermined instruction corresponding to the detection result; and carrying out display control for the item or detection control for the predetermined operation to the item on the basis of the panel information.

According to the present invention, it is possible to provide a highly convenient UI for use in a touch panel.

Further features of the present invention will become apparent from the following description of exemplary embodiments with reference to the attached drawings.

DESCRIPTION OF THE EMBODIMENTS

Embodiments

Now, an embodiment of the present invention will be described.

<Outline>

In the following description of an embodiment of the invention, an imaging apparatus controls a user interface (UI) in response to panel information related to a touch detecting method used in a touch panel provided in one or more touch panel units (external devices) connected to the imaging apparatus from the outside by way of illustration. The UI according to the embodiment is a graphical user interface (GUI) configured to display images and graphics representing items such as icons and buttons on the screen and detect operations to the graphics on the screen to generate an action in response to an instruction corresponding to the result of detection. The UI control includes at least one of UI display control or UI detection control. An example of the UI display control may include display control for the number of UIs (images and graphics representing and items such as icons and buttons) to be displayed on the screen. An example of the UI detection control may include detection control for changing a detection region (a detection range) of a UI on the screen or detection control for input operation to a UI such as switching between an active flick and an inactive flick. In the description of the embodiment, there are two kinds of accuracy information, "high" and "low" for indicating position detection accuracy by a touch panel. The touch panel with the "high" accuracy information is a two-layer capacitive touch panel including two sensor layers for detecting capacitance. The touch panel with the "low" accuracy information is a single-layer capacitive touch panel including a single sensor layer for detecting capacitance.

Note that two or more (connectable) touch panel units may be connected to the imaging apparatus. The touch detection method used in the touch panel is not limited to the capacitive type and any other arbitrary method may be used. Furthermore, the position detection accuracy is not limited to the two kinds and there may be three or more kinds. Hereinafter, the structure of an imaging apparatus 100 and a touch panel unit 150, UI display control, and processing contents will be described in the mentioned order.

<Structure of Imaging Apparatus 100>

Figure 1:
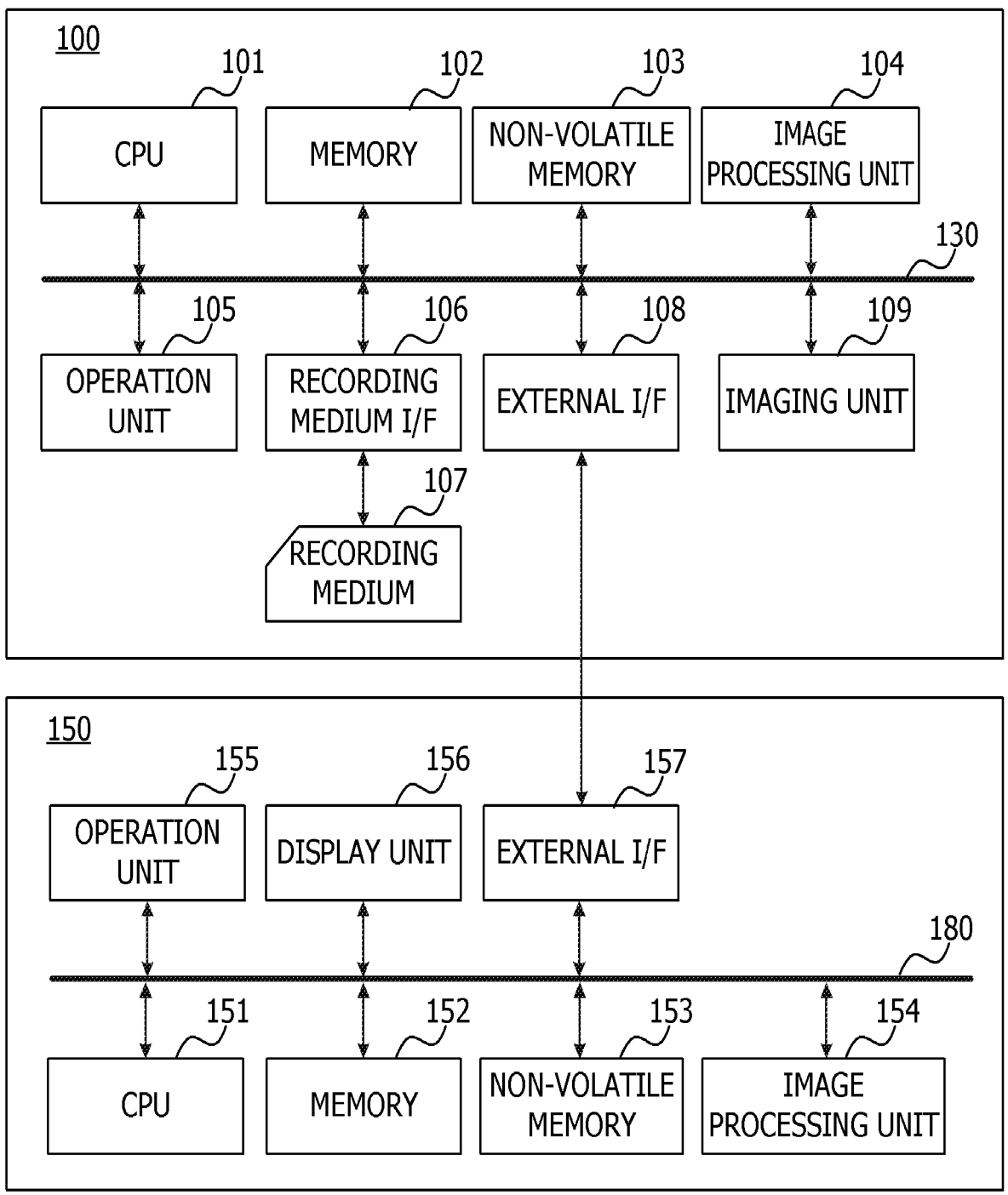
FIG. 1 is a functional block diagram showing an example of an imaging apparatus and an external device according to an embodiment of the invention.

FIG. 1 is a functional block diagram showing the imaging apparatus 100 and the touch panel unit 150 according to an embodiment of the invention by way of illustration. The imaging apparatus 100 is an information processing device (a computer) including an arithmetic operation device (a processor), a memory, a storage device, and an input/output device. When a program stored in the storage device is executed by the imaging apparatus 100, the following functions of the imaging apparatus 100 are provided. Some or all of these functions may be implemented by a dedicated logic circuit such as an ASIC and an FPGA.

In the imaging apparatus 100 according to the embodiment, an internal bus 130 is connected with a CPU 101, a memory 102, a non-volatile memory 103, an image processing unit 104, an operation unit 105, a recording medium I/F 106, an external I/F 108, and an imaging unit 109. These components connected to the internal bus 130 exchange data with each other through the internal bus 130.

The CPU 101 controls the components of the imaging apparatus 100 using the memory 102 as a working memory according to a program stored in the non-volatile memory 103. The memory 102 may be a RAM (such as a volatile memory including a semiconductor device). The non-volatile memory 103 stores image data, audio data, other kinds of data, and various programs necessary for the operation of CPU 101. The non-volatile memory 103 may include a hard disk (HD) or a ROM.

The image processing unit 104 is a functional unit configured to carry out various kinds of image processing to image data stored in the non-volatile memory 103 or the recording medium 107, image data captured by the imaging unit 109, and other data under the control of CPU 101. The image processing carried out by the image processing unit 104 may include A/D conversion processing, D/A conversion processing, image data encoding processing, compression processing, decoding processing, expansion/reduction processing (resizing), noise attenuation processing, and color conversion processing. The image processing unit 104 may be provided as a circuit block dedicated for carrying out particular image processing. Alternatively, depending on the kind of image processing, the CPU 101 may carry out image processing according to a program without using the image processing unit 104.

The operation unit 105 is an input device configured to receive user operation including a character information input device such as a keyboard, a pointing device such as a mouse device, a button, a dial, a joystick, a touch sensor, and a touch pad. The recording medium I/F 106 can be mounted with a recording medium 107 such as a memory card, a CD, and a DVD, and reads out data from the mounted recording medium 107 or writes data to the recording medium 107 under the control of the CPU 101.

The external I/F 108 is an interface configured to input and output an image signal (including a video signal), an audio signal, and a control signal. According to the embodiment, an external touch panel unit 150 is mounted to the external I/F 108. The imaging unit 109 is a camera unit which may include an imaging element such as a CCD sensor and a CMOS sensor, a zoom lens, a focus lens, a shutter, a diaphragm, a range finder unit, and an A/D converter. The imaging unit 109 can capture a still image and a moving image, and the image data on the captured images is transmitted to the image processing unit 104, subjected to various processing, and then recorded in the recording medium 107 as a still image file and a moving image file, respectively.

According to the embodiment, the imaging apparatus 100 has two operation modes, an imaging mode and a playback mode. The imaging mode is an operation mode for capturing an image by the imaging unit 109 and recording the captured image in the recording medium 107. The playback mode is an operation mode for reading out an image recorded in the recording medium 107 and reproducing and displaying the image on the display unit 156 of the touch panel unit 150 connected to the external I/F 108. The operation mode is switched between the imaging mode and the playback mode in response to pressing of a mode switching button.

<Structure of Touch Panel Unit 150>

The touch panel unit 150 is an information processing device (a computer) which includes an arithmetic operation device (a processor), a memory, a storage device, and an input/output device. The touch panel unit 150 executes a program stored in the storage device, so that the functions of the touch panel unit 150 which will be described are provided. Some or all of these functions may be implemented by a dedicated logic circuit such as an ASIC and an FPGA.

In the touch panel unit 150 according to the embodiment, an internal bus 180 is connected with a CPU 151, a memory 152, a non-volatile memory 153, an image processing unit 154, an operation unit 155, a display unit 156, and an external I/F 157. These components connected to the internal bus 180 exchange data with each other via the internal bus 180.

The CPU 151, the memory 152, and the non-volatile memory 153 are the same functional units as the CPU 101, the memory 102, and the non-volatile memory 103 of the imaging apparatus 100, and therefore the description thereof will not be provided. The image processing unit 154 is a functional unit configured to perform various kinds of image processing to an image signal input from the external I/F 157. The image signal includes an image captured by the imaging unit 109 of the imaging apparatus 100, and a GUI screen which forms a graphical user interface (GUI) generated by the image processing unit 104 of the imaging apparatus 100.

The operation unit 155 is an input unit (accepting means) configured to accept operations by a user. According to the embodiment, the operation unit 155 includes a touch panel. The touch panel and the display unit 156 can be formed integrally. For example, the touch panel is configured to have light transmittance which does not prevent the display operation of the display unit 156 and attached to an upper layer of the display surface of the display unit 156. Input coordinates on the touch panel are associated with display coordinates on the display screen of the display unit 156. In this way, a GUI which allows the user to feel as if the user can directly operate the screen displayed on the display unit 156 is provided.

The CPU 151 detects the following operations to the touch panel or the states of the touch panel.

A new touch on the touch panel by a finger or pen that has not been in touch with the touch panel. In other words, the start of a touch (hereinafter referred to as touch-down) is detected.

A finger or pen in contact with (touching) the touch panel (herein after referred to as touch-on).

The movement of a finger or pen in progress while in contact with the touch panel (hereinafter referred to as touch-move).

Detachment of a finger or pen (which has been in contact with the touch panel) from the touch panel. In other words, the end of touching (hereinafter referred to as touch-up) is detected.

A state in which nothing touches the touch panel (hereinafter referred to as touch-off) is detected.

When touch-down is detected, touch-on is also detected at the same time. After the touch-down, the touch-on normally continues to be detected unless touch-up is detected. Touch-move is also detected while touch-on is detected. Even when touch-on is detected, touch-move is not detected unless the touch position is moved. After detecting touch-up of all the fingers or pen that have been in contact, a touch-off state—is attained.

These operations/states and position coordinates touched by a finger or pen on the touch panel are informed to the CPU 151 through the internal bus, and the CPU 151 determines the kind of operation (touch operation) performed on the touch panel on the basis of the information. As for touch-move, the moving direction of the finger or pen moving on the touch panel can also be determined for each vertical/horizontal component on the touch panel on the basis of change in position coordinates. Here, the operation of touching and releasing in a predetermined period with no movement (the movement distance is not more than a first threshold) is called a tap. When touch-move for a predetermined distance or more is detected, it is determined that a sliding operation has been performed. The operation of quickly moving (within a predetermined period) for a certain distance (at least a second threshold) while keeping a finger touching the touch panel and releasing directly thereafter is called a flick. In other words, a flick is the operation of quickly tracing the surface of the touch panel as if striking the touch panel by the finger. When touch move at least for a predetermined distance and at least at a predetermined speed is detected, and touch-up is detected directly thereafter, it can be determined that flick has been performed (it can be determined that flick has been performed following the sliding operation). Furthermore, multiple touch positions (for example 2 points) are simultaneously touched to bring the touch positions closer to each other is called pinch-in, and a touch operation to move the touch positions apart from each other is called pinch-out. Pinch-out and pinch-in are collectively referred to as a pinch operation (or simply pinch). The touch panel may be based on any touch detection method among various types of touch panels such as resistive film type, capacitive type, surface acoustic wave type, infrared type, electromagnetic induction type, image recognition type, and optical sensor type touch panels. Among the methods, a touch is detected when there is a contact upon a touch panel according to one detection method, while a touch is detected when a finger or pen approaches a touch panel according to another detection method, and a touch panel of any type may be used.

The display unit 156 is a member configured to display an image based on an image signal output from the image processing unit 154. The external I/F 157 is an interface configured to input/output an image signal, an audio signal or a control signal. According to the embodiment, the imaging apparatus 100 is mounted to the external I/F 157. The external I/F 157 is connected with the external I/F 108 of the imaging apparatus 100 through a wire cable or wireless communication.

The touch panel unit 150 detects a touch panel operation input by the user and transmits the touch panel operation as input information on the touch panel to the imaging apparatus 100 through the external I/F 157. The input information on the touch panel includes information such as the presence/absence of a touch operation (a tap or a flick in the example according to the embodiment) and position coordinates at which the touch operation is detected.

In addition, the touch panel unit 150 has panel information related to the touch detecting method used in the incorporated touch panel. According to the embodiment, the panel information indicates accuracy information representing position detection accuracy by the touch panel. Hereinafter, how the imaging apparatus 100 obtains accuracy information from the touch panel unit 150 will be described. In the following example of the embodiment, there are two types of accuracy information, "high" and "low." The accuracy information is written in advance in the non-volatile memory 153. The imaging apparatus 100 receives the accuracy information while in connection with the touch panel unit 150 and performs display control for the UI according to the type, so that a highly convenient UI according to the touch panel accuracy is provided.

<Display Control for User Interface>

Now, a UI displayed on the display unit 156 of the touch panel unit 150 when the imaging apparatus 100 and the touch panel unit 150 are connected will be described. According to the embodiment, the imaging apparatus 100 changes the number of items displayed on the UI on the screen or the display size of each item or the touch detection region for each item on the screen according to touch panel accuracy information received from the touch panel unit 150 connected thereto. Also according to the embodiment, the imaging apparatus 100 switches between activity and inactivity for a flick in response to the touch panel accuracy information received from the touch panel unit 150 connected thereto.

<<Example of how Number of Buttons Displayed on Screen is Changed (Imaging Mode)>>

Figure 2:
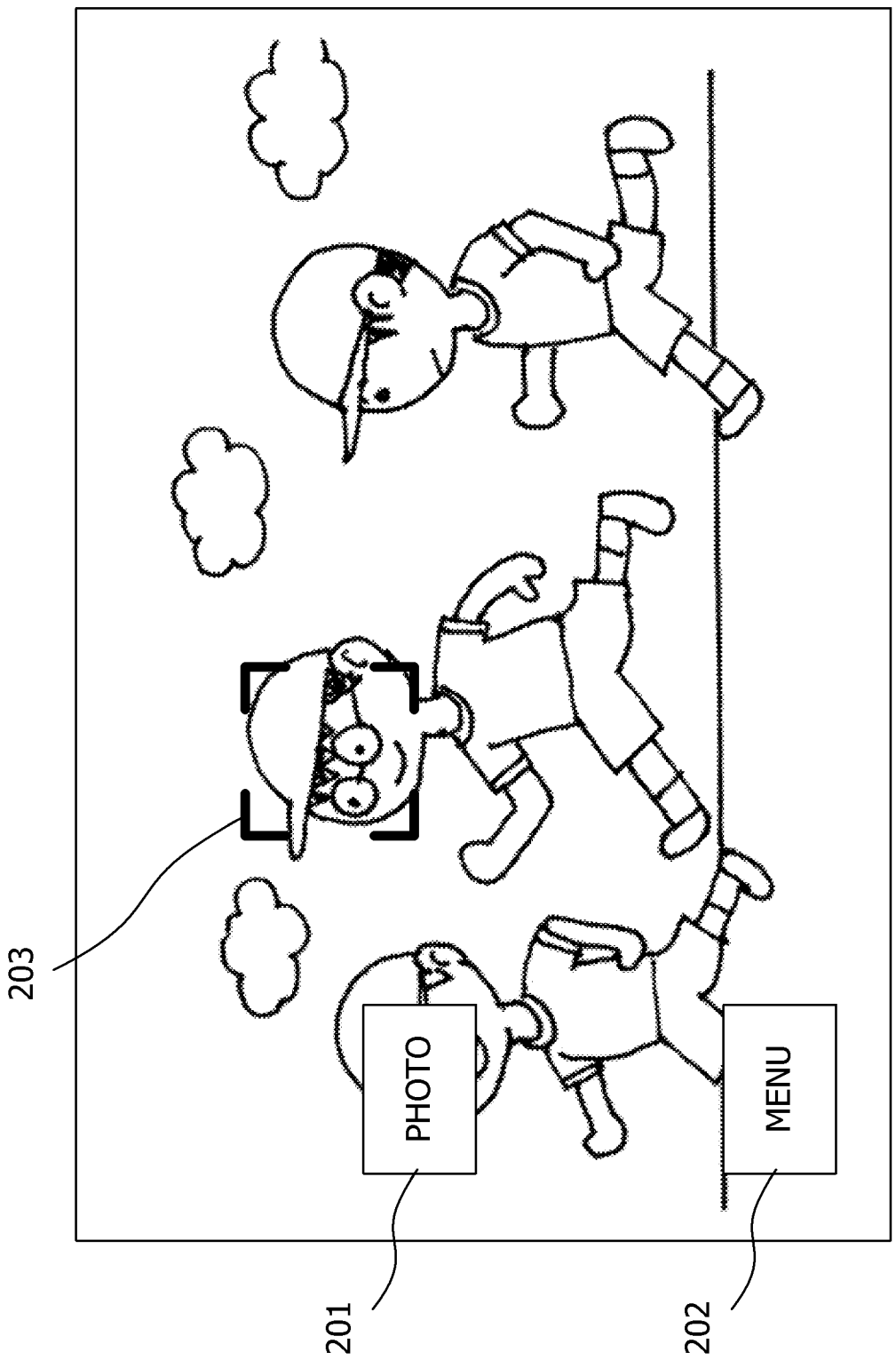
FIG. 2 is a view showing an example of a screen display in an imaging mode according to the embodiment.

FIG. 2 shows a basic screen (an initial screen) displayed on the display unit 156 of the touch panel unit 150 when the operation mode of the imaging apparatus 100 is the imaging mode. The photo button 201 is a button for accepting an imaging instruction from the user. When a tap on the photo button 201 is detected, the imaging apparatus 100 captures a still image and stores the obtained image data in the recording medium 107. The menu button 202 is a button for accepting an instruction to display a menu screen. Upon detecting a tap on the menu button 202, the imaging apparatus 100 instructs the touch panel unit 150 to change the screen to a menu screen for changing various settings for the imaging apparatus 100.

In the touch panel unit 150, when a location other than the photo button 201 and the menu button 202 is tapped, the imaging apparatus 100 performs an autofocus (AF) operation on the object corresponding to the position. At the time, the imaging apparatus 100 instructs the touch panel unit 150 to display a frame (hereinafter referred to as an AF frame) in order to indicate to which position the autofocus operation is performed. The frame 203 is an example of the displayed AF frame.

Figure 3:
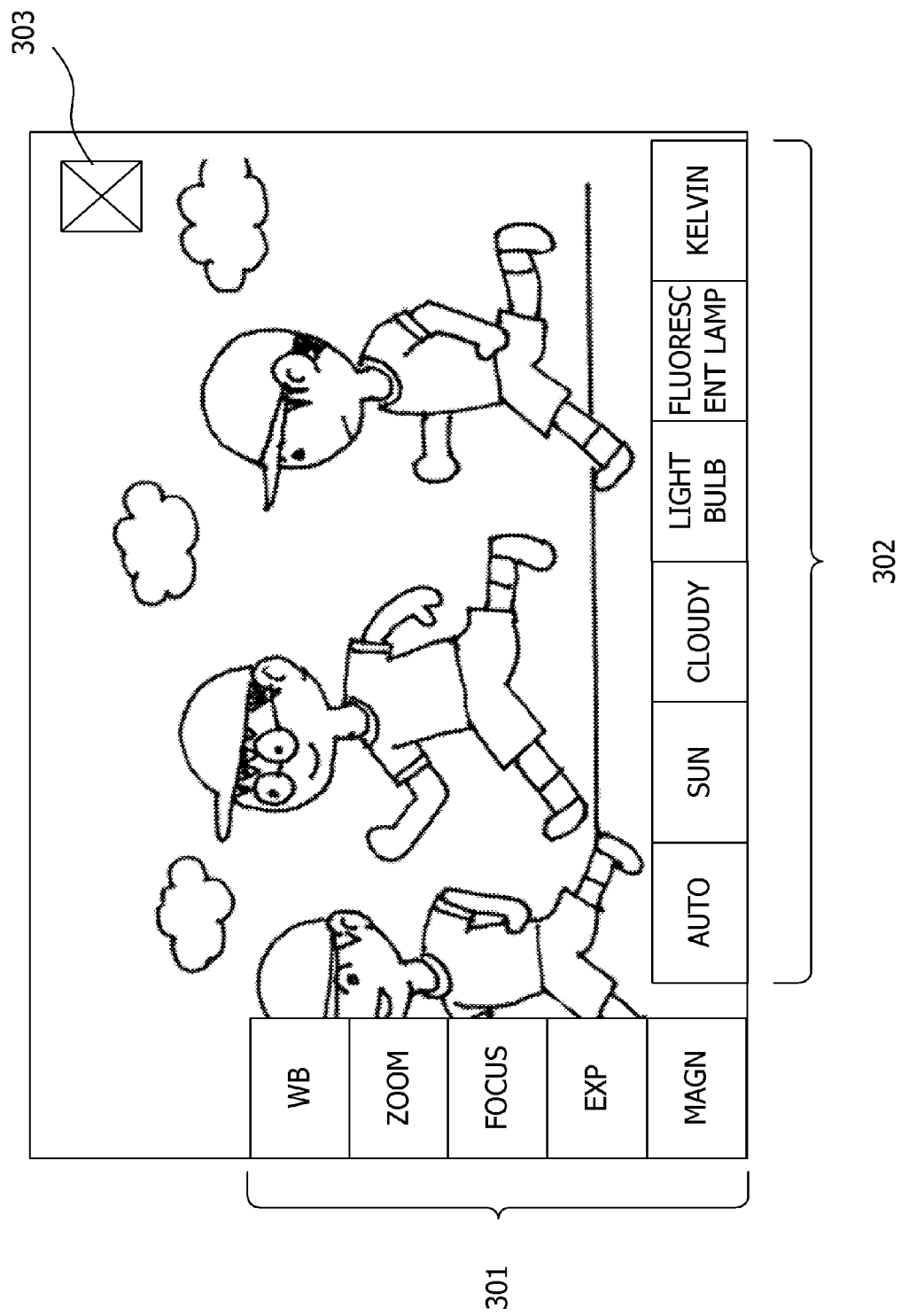
FIG. 3 is a view showing an example of a screen display in an imaging mode according to the embodiment.

FIG. 3 shows an example of a menu screen displayed when the touch panel accuracy information is "high." The function selecting button 301 is a button (UI) for selecting a function to have its setting changed (accepting a button selection instruction). The user taps one of the function selecting buttons 301 to select a target function for which various settings are to be changed. In the example shown in FIG. 3, buttons for selecting the functions of WB (white balance), ZOOM (zooming), FOCUS (focusing), EXP (exposure), and MAGN (magnified display) are displayed sequentially from the top. The setting change button 302 is a button for changing the setting corresponding to the function selected by the user. The user taps one of the setting change buttons 302 to change the setting of the function selected by the function selecting button 301. FIG. 3 shows an example of a screen display when WB is selected by the function selecting button 301. As the setting change buttons 302 when WB is selected, auto, sun, cloudy, light bulb, fluorescent lamp, and Kelvin are displayed in order from the left by way of illustration. The close button 303 is a button for closing the menu screen. When the user taps the close button 303, the menu screen ends, and the screen changes to the imaging mode basic screen in FIG. 2.

Figure 4:
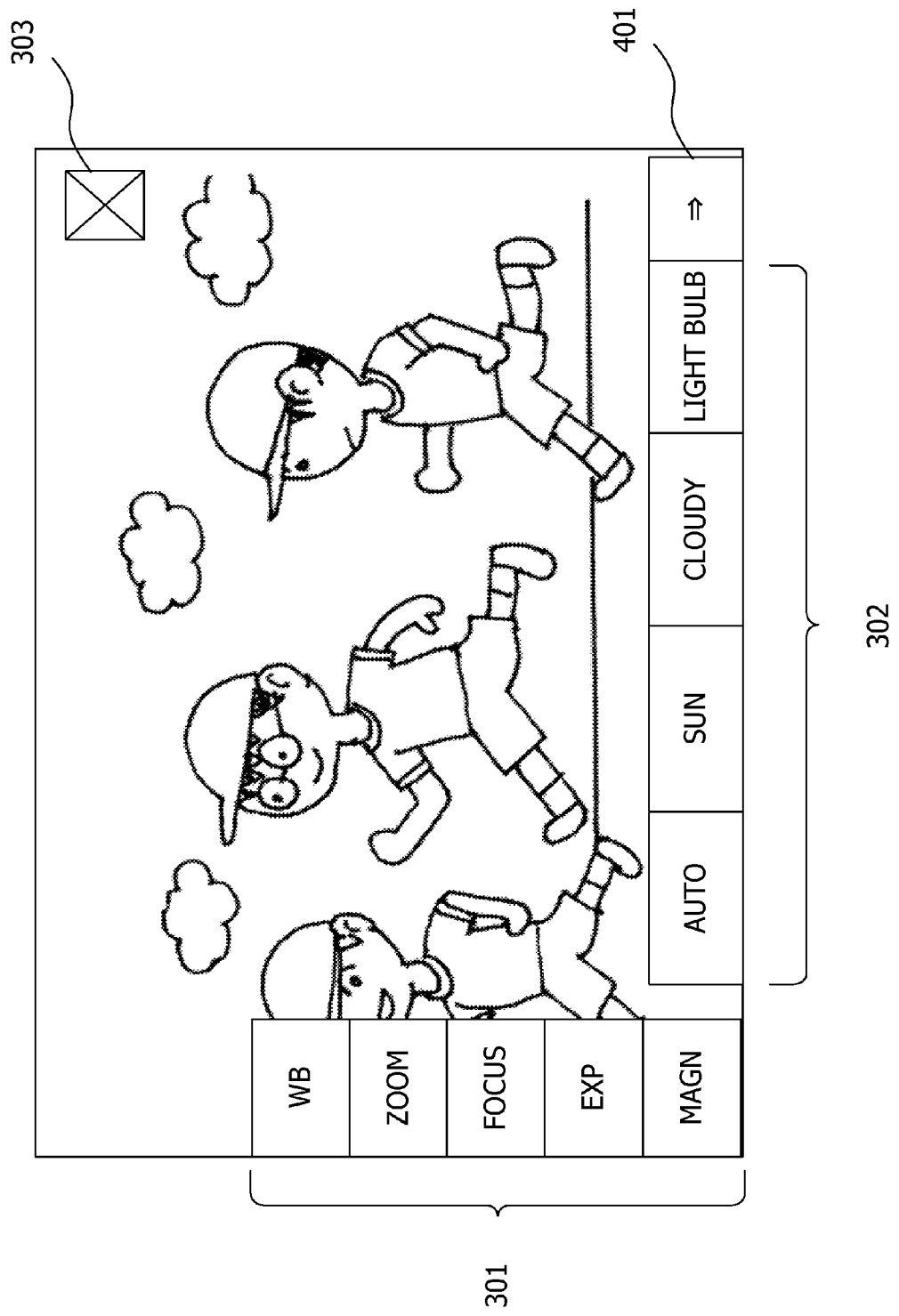
FIG. 4 is a view showing an example of a screen display in an imaging mode according to the embodiment.

FIG. 4 is an example of a menu screen display when the touch panel position detection accuracy is low. Here, when the number of buttons displayed at one time is large, the size of each button becomes small, and it is highly likely that an unintended button is detected as a pressed button (erroneous detection). Therefore, when the touch panel position detection accuracy is low, the number of setting change buttons 302 is reduced, so that each setting change button 302 is displayed large. When tapped, the display switching button 401 displays a button other than those displayed on the display unit 156. In the example shown in FIG. 4, when the display switching button 401 is pressed, the setting change buttons 302 for fluorescent lamp and Kelvin are displayed in place of the buttons for auto, sun, cloudy, and light bulb.

Note that only the size may be changed without changing the number of buttons. Alternatively, only the number may be changed without changing the size of the button. For example, when the touch panel position detection accuracy is low, erroneous detection is reduced by reducing the number and increasing the intervals between the buttons. Note that the factor for changing the size and the number of buttons is not limited to the touch panel position detection accuracy and the size and the number may be changed according to the size of the display unit 156.

<<Example of How Touch Detection Region for Buttons on Screen Is Changed (Imaging Mode)>>

Figure 5:
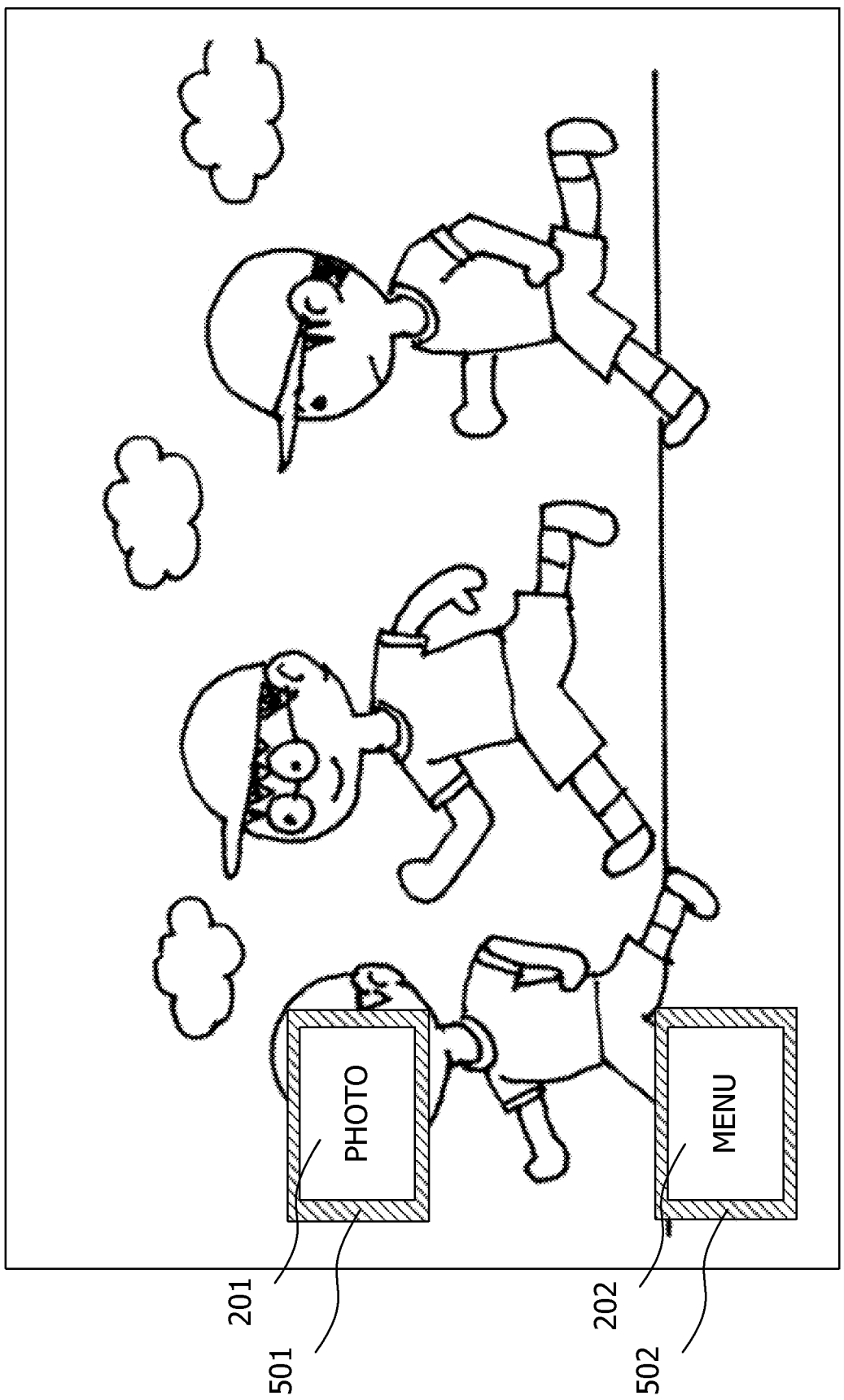
FIG. 5 is a view showing an example of a touch detection range according to the embodiment.
Figure 6:
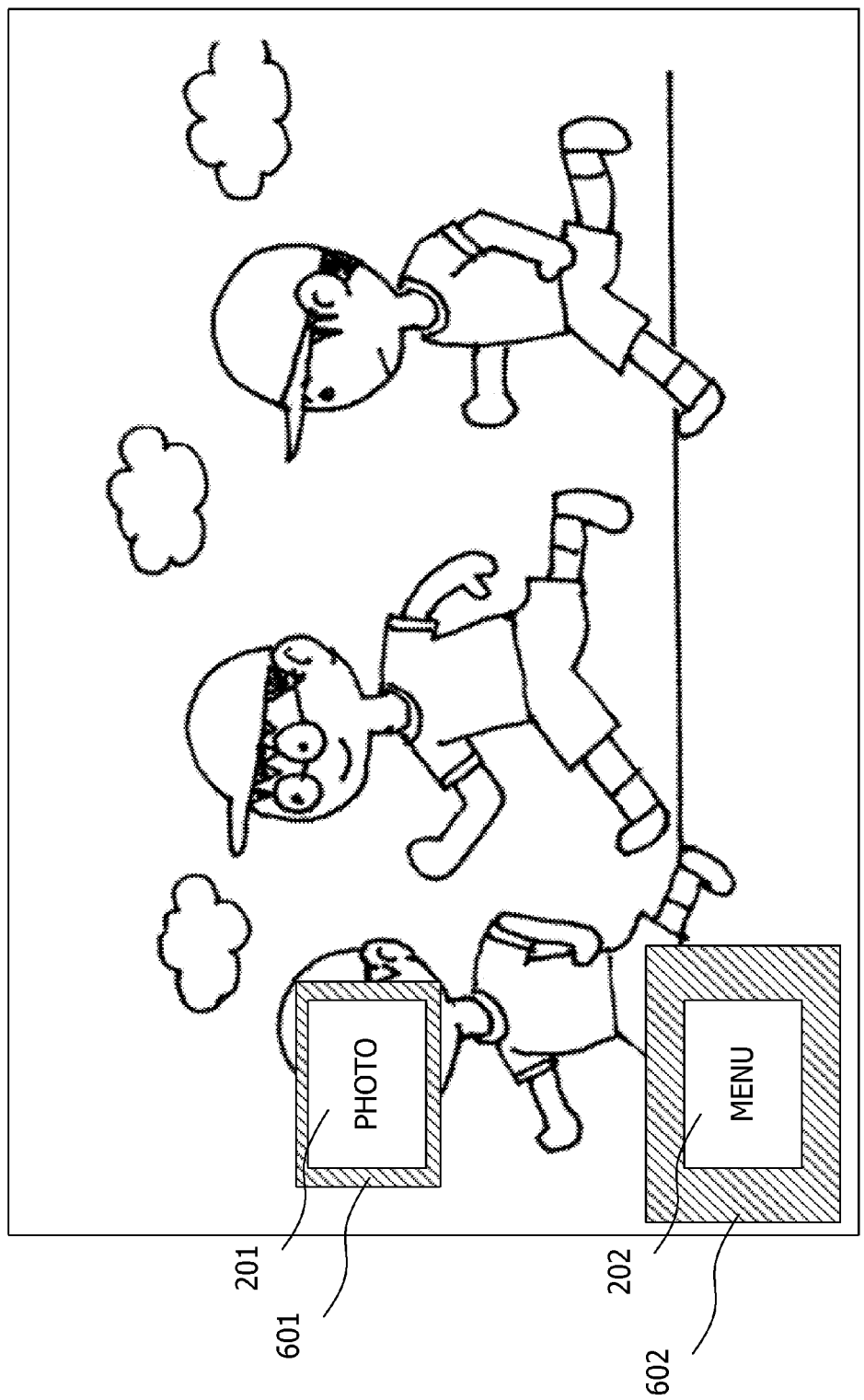
FIG. 6 is a view showing an example of a touch detection range according to the embodiment.

FIG. 5 shows an example of the size of a touch detection region when the touch panel accuracy information is "high." A region 501 indicates a touch detection region corresponding to the photo button 201, and a region 502 indicates a touch detection region corresponding to the menu button 202. FIG. 6 shows an example of the size of a touch detection region when the touch panel position detection accuracy is low. A region 601 indicates a touch detection region corresponding to the photo button 201, and a region 602 indicates a touch detection region corresponding to the menu button 202. When FIG. 5 is compared with FIG. 6, the regions 501 and 601 corresponding to the photo button 201 are not different in size, but between the regions 502 and 602 corresponding to the menu button 202, the region 602 corresponding to the low touch panel position detection accuracy has a greater size.

As described above, using a touch panel unit provided with a touch panel with low position detection accuracy, coordinate detection accuracy for a peripheral area (a region within a predetermined distance from at least one of upper, lower, left and right ends) may particularly be low. Therefore, even when the user intends to tap the menu button 202 located at the lower end, it is highly likely that the CPU 151 cannot recognize the tap. Therefore, the number of buttons or the size of the buttons is changed or the touch detection region is increased, so that even a touch panel with low position detection accuracy can easily be touched. Here, when a touch panel unit with "high" touch panel accuracy information is connected, it looks as if the touch detection region may constantly be expanded. However, if the touch detection region is constantly expanded, the touch detection region for the menu button 202 is expanded, so that the area available for designating the AF frame is reduced. Therefore, expanding the touch detection region is not always desirable, and the control is separately carried out for the "high" and "low" touch panel accuracy information.

<<Example of how to Switch Between Activity and Inactivity for Flick (Playback Mode)>>

Figure 7:
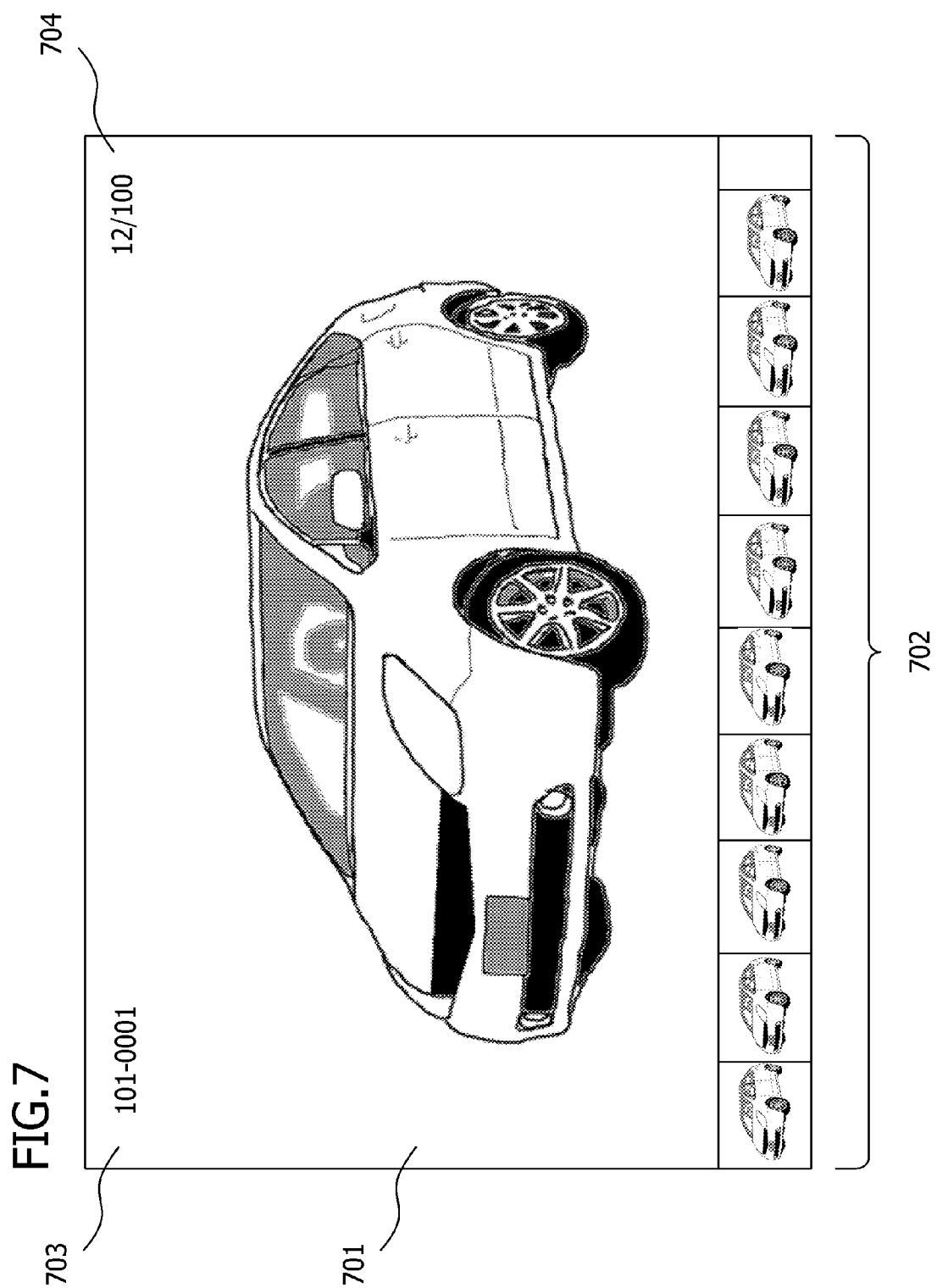
FIG. 7 is a view showing an example of a screen display in a playback mode according to the embodiment.
Figure 8:
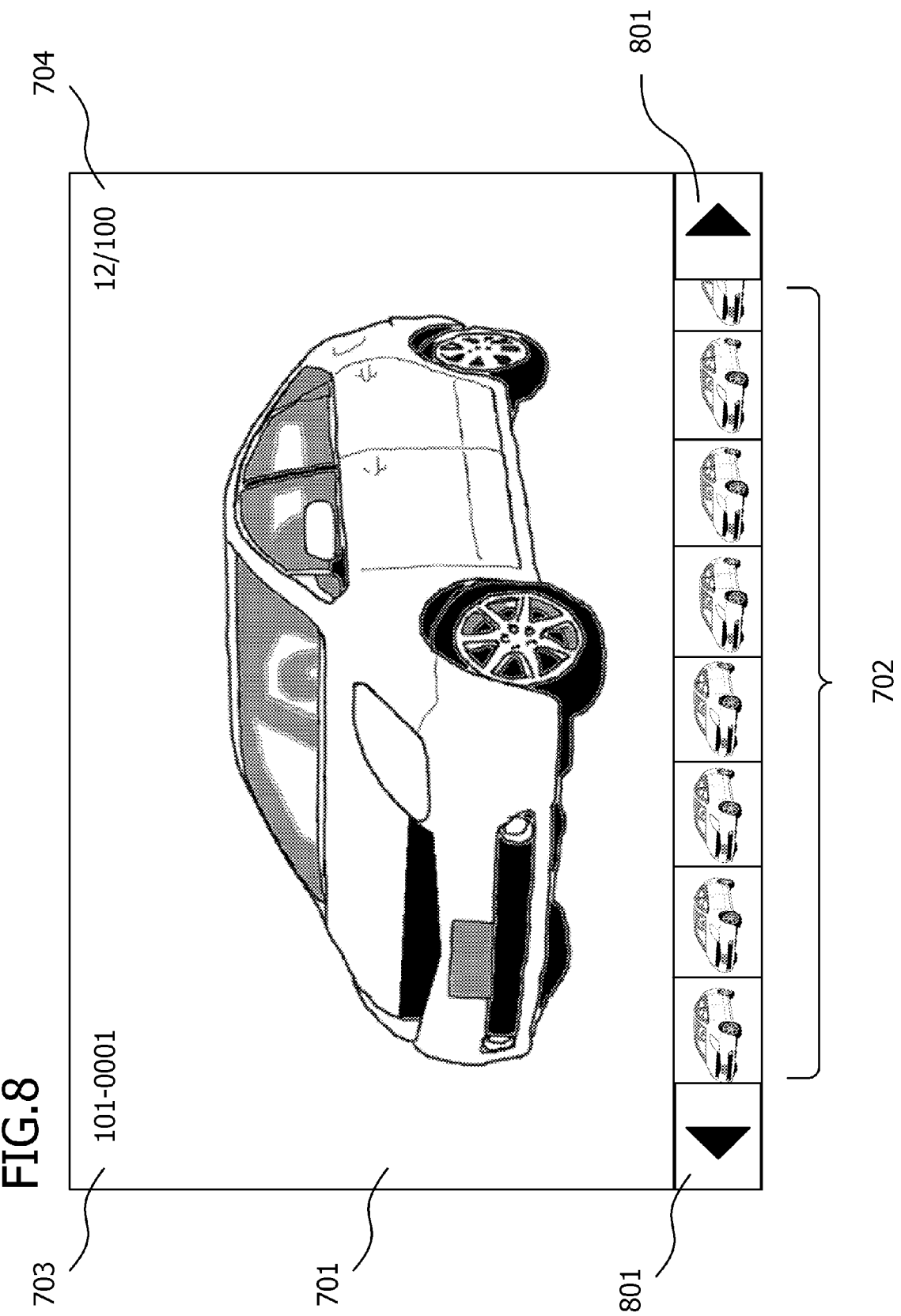
FIG. 8 is a view showing an example of a screen display in a playback mode according to the embodiment.

FIGS. 7 and 8 show a basic screen (initial screen) displayed on the display unit 156 of the touch panel unit 150 when the operation mode of the imaging apparatus 100 is the playback mode. According to the embodiment, the imaging apparatus 100 carries out control for switching between activity and inactivity for a flick according to touch panel accuracy information received from a touch panel unit 150 connected thereto.

FIG. 7 is an example of a screen display when the touch panel accuracy information is "high." One of still images (or moving images) stored in the recording medium 107 is read out and displayed at a main image display portion 701. The user switches still images to be displayed by flicking the main image display portion 701 horizontally.

Multiple thumbnail images (images displayed in a reduced size) are read from still images stored in the recording medium 107 and displayed at a thumbnail display portion 702. The user switches still images displayed at the main image display portion 701 by tapping the thumbnail image displayed at the thumbnail display portion 702. At the time, the display of the thumbnail image is scroll-controlled so that the tapped thumbnail image is in the center. Also, the user can scroll the thumbnail image (scrolling instruction) by flicking the thumbnail display portion 702 horizontally. When the scrolling is stopped, a still image corresponding to the thumbnail image positioned in the center of the thumbnail display portion 702 is displayed at the main image display portion 701.

The number display portion 703 displays the file number of the image displayed at the main image display portion 701. Here, the file number is a number allocated to each of still images to identify the still images. The number display portion 704 displays a number indicating the position of displayed the still image counting from the top and the total number of still images. In the example shown FIG. 7, the number of still images stored in the recording medium 107 is 100 and the image displayed at the main image display portion 701 is the twelfth image among them.

FIG. 8 is an example of a screen display when the touch panel position detection accuracy is low. When a touch panel unit provided with a touch panel with low position detection accuracy, the coordinate detection accuracy particularly for the peripheral area is low, and therefore it is highly likely that a tap operation is erroneously detected as a flick when the user taps the peripheral area. Therefore, when the touch panel unit 150 provided with a touch panel with low position detection accuracy is connected, the CPU 101 sets a flick operation to the thumbnail display portion 702 positioned at the lower end of the screen to be inactive and determines that there is no corresponding instruction upon detecting the flick operation, so that no action is generated. Meanwhile, the CPU 101 sets a tap operation only to the thumbnail display portion 702 positioned at the lower end of the screen to be active, accepts an instruction corresponding to the tap operation, and executes the action according to the instruction. However, when the flick operation is inactive, the thumbnail image cannot be scrolled, so that a thumbnail scroll button 801 is displayed instead at the left and right ends of the screen. When the user taps the thumbnail scroll button 801, the thumbnail images are switched by one page.

<Content of Processing by Imaging Apparatus 100: Overall>

Now, the flow of processing performed by the CPU 101 in the imaging apparatus 100 will be described with reference to the flowcharts shown in FIGS. 9 to 11. In the following example according to the embodiment, the imaging apparatus 100 controls the UI according to the touch panel accuracy (accuracy information) of the connected touch panel unit 150. Note that processing constantly performed when the imaging apparatus 100 and the touch panel unit 150 are connected is not shown in the flowchart. An example of such constantly performed processing is transmission of an image signal such as a captured image or a UI display to be displayed on the display unit 156 from the imaging apparatus 100 to the touch panel unit 150 through the external I/F 108.

Figure 9:
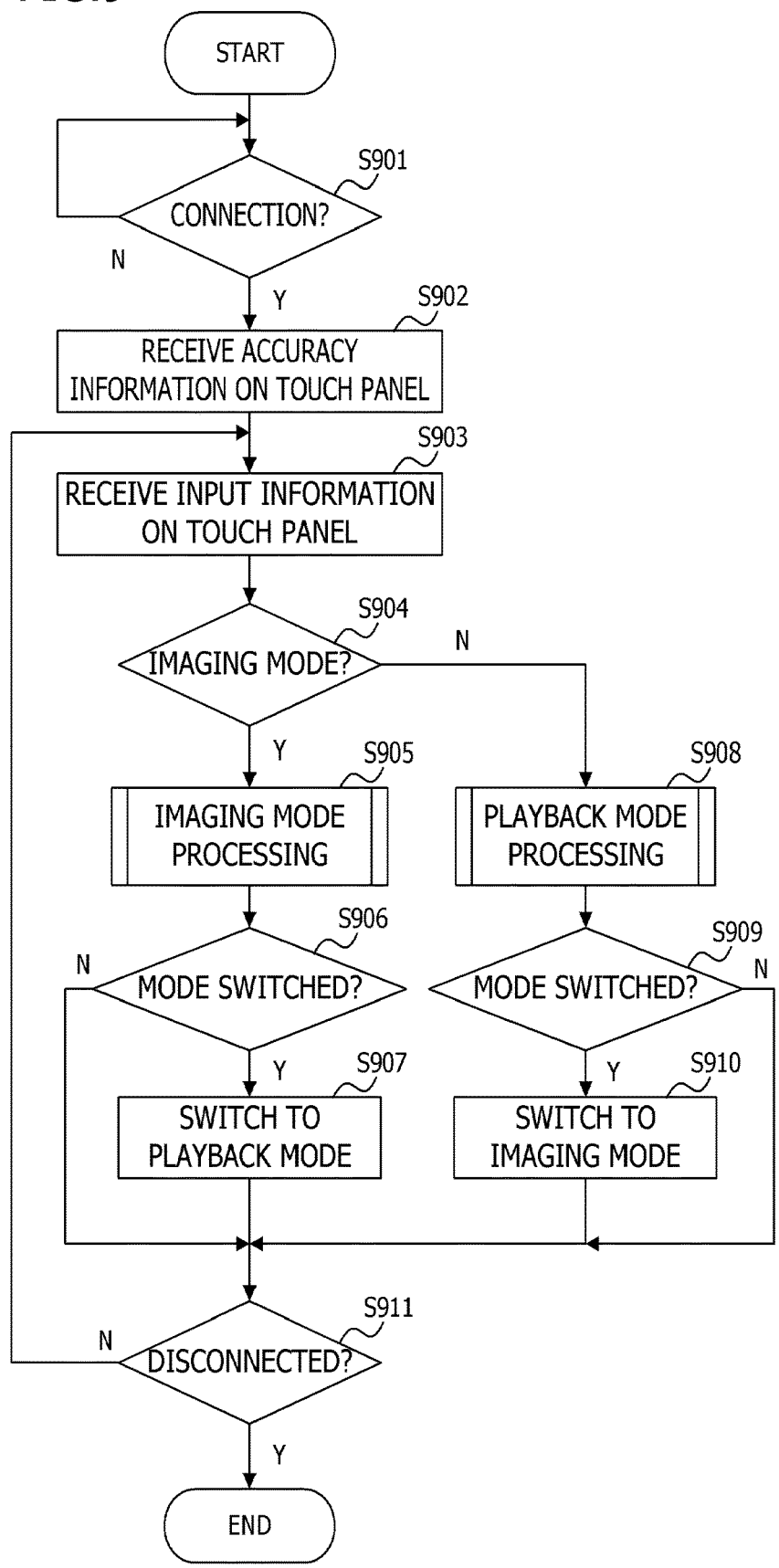
FIG. 9 is a flowchart for illustrating an example of processing by the imaging apparatus according to the embodiment.

FIG. 9 is a flowchart for illustrating the flow of a series of processing steps performed by the CPU 101 of the imaging apparatus 100. FIG. 9 shows processing performed by the CPU 101 until the touch panel unit 150 is detached after the touch panel unit 150 is attached to the imaging apparatus 100 and carries out an operation in the imaging mode or the playback mode.

In step S901, the CPU 101 determines whether the external I/F 157 of the touch panel unit 150 is connected to the external I/F 108. If the external I/F 157 of the touch panel unit 150 is connected to the external I/F 108, the process proceeds to step S902, and if not, the process remains in step S901.

In step S902, the CPU 101 communicates with the touch panel unit 150 through the external I/F 108 and the external I/F 157 and receives accuracy information on the touch panel provided at the touch panel unit 150. Note that information indicating a touch detection method may be received as touch panel information instead of the accuracy information. In the case, accuracy information for each touch detection method is stored in the non-volatile memory 103, and the CPU 101 reads, from the non-volatile memory 103, accuracy information corresponding to the touch detection method indicated by the received touch panel information.

In step S903, the CPU 101 communicates with the touch panel unit 150 through the external I/F 108 and the external I/F 157 and receives input information about the touch panel provided at the touch panel unit 150.

In step S904, the CPU 101 reads the current operation mode from the memory 102 and determines whether the mode is the imaging mode (according to the embodiment, the playback mode). If the mode is the imaging mode, the process proceeds to step S905, and if not, the process proceeds to step S908.

In step S905, the CPU 101 performs various kinds of processing to be performed in the imaging mode. Details of the imaging mode processing will be described later with reference to the flowchart shown in FIG. 10. Then, the process proceeds to step S906.

In step S906, the CPU 101 determines whether the mode switching button (not shown) of the operation unit 105 has been tapped. According to the embodiment, the mode switching button is a button for switching between the imaging mode and the playback mode in the imaging apparatus 100. If the mode switching button has been tapped, the process proceeds to step S907, and if not, the process proceeds to step S911.

In step S907, the CPU 101 performs processing for switching the operation mode of the imaging apparatus 100 to the playback mode. More specifically, the CPU 101 stops the operation of the imaging unit 109 and updates (writes)

the operation mode recorded in the memory 102 to the playback mode. Then, the process proceeds to step S911.

In step S908, the CPU 101 performs various kinds of processing to be performed in the playback mode. Details of the processing will be described later with reference to the flowchart shown in FIG. 11. Then, the process proceeds to step S909.

In step S909, the CPU 101 determines whether the mode switching button of the operation unit 105 has been tapped. If the mode switching button has been tapped, the process proceeds to step S910, and if not, the process proceeds to step S911.

In step S910, the CPU 101 performs processing for switching the imaging apparatus 100 to the imaging mode. More specifically, the CPU 101 starts the operation of the imaging unit 109 and updates the operation mode recorded in the memory 102 to the imaging mode. Then, the process proceeds to step S911.

In step S911, the CPU 101 determines whether the external I/F 108 and the external I/F 157 of the touch panel unit 150 are disconnected. If the external I/F 108 and the external I/F 157 of the touch panel unit 150 are disconnected, the process ends here, and if not, the process returns to step S903.

<Content of Processing by Imaging Apparatus 100: Imaging Mode Processing>

Figure 10:
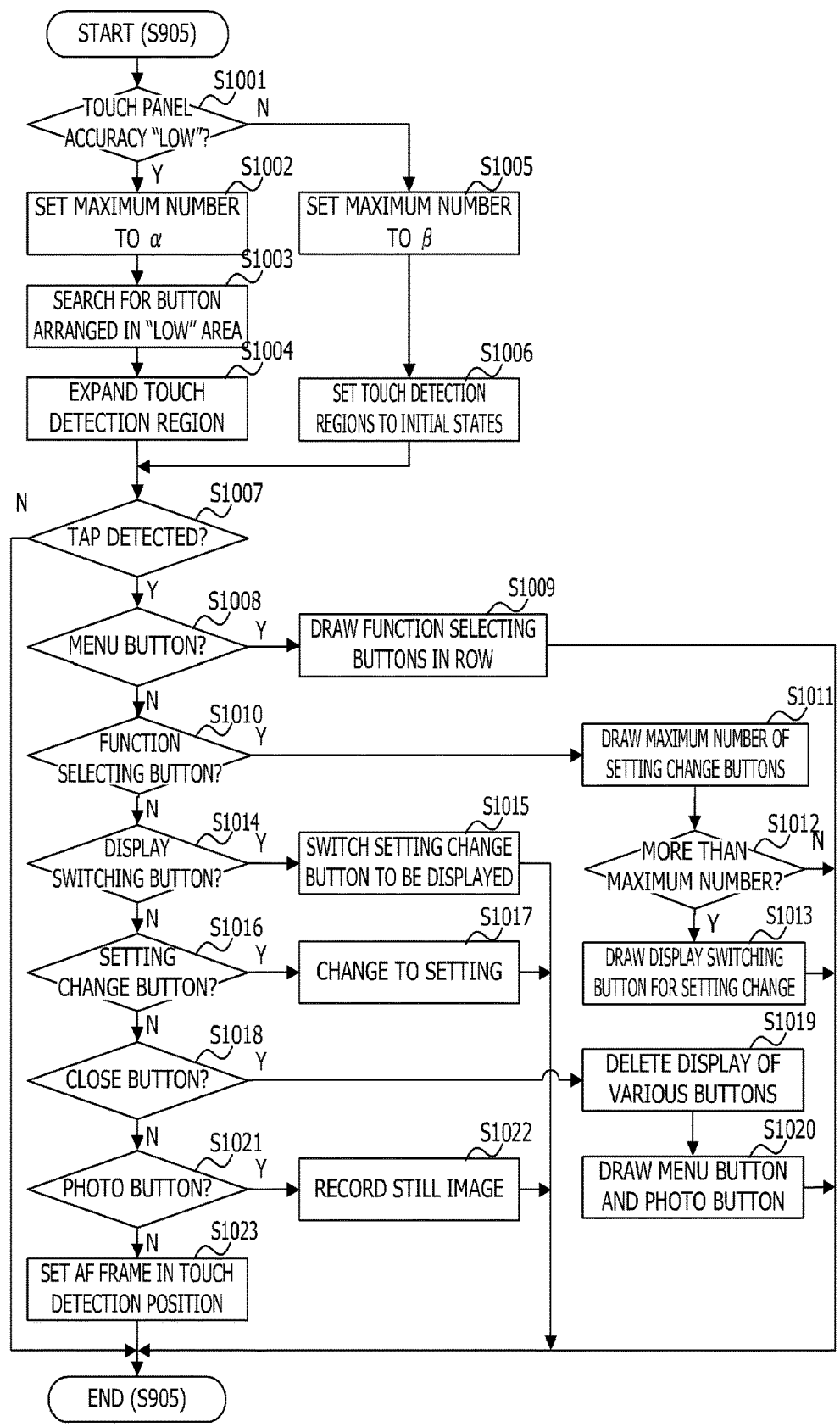
FIG. 10 is a flowchart for illustrating an example of imaging mode processing according to the embodiment.

FIG. 10 is a flowchart showing the flow of processing (S905) executed by the CPU 101 in the imaging mode. In the following example according to the embodiment, the CPU 101 accepts a tap operation in the imaging mode. Note that the CPU 101 may accept an operation such as a flick operation.

In step S1001, the CPU 101 determines whether the touch panel accuracy information received in step S902 in FIG. 9 is "low." If the accuracy information is "low," the process proceeds to step S1002, and if not (if the accuracy information is "high" according to this embodiment), the process proceeds to step S1005.

In step S1002, the CPU 101 sets the maximum number of setting change buttons 302 that can be displayed on the screen to a and writes the number in the memory 102. In this example, a is a positive integer that satisfies 0<α. Although α is 4 in the example of the setting change buttons 302 shown in FIG. 4, the number is not particularly limited and may be changed according to the size of the display unit 156.

In step S1003, the CPU 101 searches for a button arranged in an area in which the coordinate detection accuracy by the touch panel is low. According to the embodiment, the area with low coordinate detection accuracy is a predetermined region in the peripheral area of the display unit 156. In the touch panel unit 150 provided with a touch panel with low position detection accuracy, the area of the touch panel having low coordinate detection accuracy is stored in advance in the non-volatile memory 103. When the area with low coordinate detection accuracy includes the four corners of the button, the CPU 101 determines that the button is arranged in the area with low coordinate detection accuracy by the touch panel on the basis of the accuracy information and the coordinates and size of the button currently displayed on the screen. The CPU 101 stores, in the memory 102, which button is arranged in the area with low touch panel coordinate detection accuracy. Note that considering the button has a shape other than the rectangular shape, it may be determined that the button is arranged in the area if the button is partly included in the area or the position of the center of gravity of the button is included in the area.

In step S1004, the CPU 101 refers to the memory 102 and sets the touch detection region so that the touch detection region for the button determined to be arranged in the area with low touch panel coordinate detection accuracy in step S1003 is wider than the initial state. In this example, the initial state can be a region according to the button size.

In step S1005, the CPU 101 sets the maximum number of setting change buttons 302 that can be displayed on the screen to β and writes the number in the memory 102. Here, β is a positive integer that satisfies 0<α≤β. Although β is 6 in the example of the setting change buttons 302 shown in FIG. 3, the number is not particularly limited and may be changed according to the size of the display unit 156. Then in step S1006, the CPU 101 sets the touch detection region so that the touch detection regions for all the buttons on the screen are set to the initial states (a region corresponding to the button size).

In step S1007, the CPU 101 detects a tap operation from the touch panel input information received from the touch panel unit 150. If the tap operation is detected, the process proceeds to step S1008, and if not the process in the imaging mode (S905) ends.

In step S1008, the CPU 101 determines whether the detection position of the tap operation detected in step S1007 is within the touch detection region corresponding to the menu button 202. If the position is in the touch detection region corresponding to the menu button 202, the process proceeds to step S1009, and if not, the process proceeds to step S1010.

In step S1009, the CPU 101 controls the image processing unit 104 to draw function selecting buttons 301. In the example of FIG. 3, buttons for selecting the functions of WB (white balance), ZOOM (zooming), FOCUS (focusing), EXP (exposure), and MAGN (magnified display) are displayed as the function selecting buttons 301. According to the embodiment, the CPU 101 controls the image processing unit 104 to delete the display of the photo button 201 and the menu button 202. The CPU 101 may deactivate the photo button 201 and the menu button 202.

In step S1010, the CPU 101 determines whether the detection position of the tap operation detected in step S1007 is within the touch detection region corresponding to the function selecting buttons 301. If the position is within the touch detection region corresponding to any of the function selecting buttons 301, the process proceeds to step S1011, and if not, the process proceeds to step S1014.

In step S1011, the CPU 101 draws the maximum number (α or β) of the setting change buttons 302 corresponding to the setting change target function detected in step S1010. Since the maximum number is stored in the memory 102 in steps S1002 and S1005, the CPU 101 reads the value for the maximum number. Here, as shown in the setting change button 302 in FIG. 4, the CPU 101 preferably increases the size of the setting change buttons 302 displayed on a touch panel with low position detection accuracy. This is because a touch operation intended by the user may be detected more easily in this way even when the touch panel position detection accuracy is low.

In step S1012, the CPU 101 determines whether the number of setting change buttons 302 corresponding to the setting change target function detected in step S1010 is larger than the maximum number. If the number is larger than the maximum number, the process proceeds to step S1013, and if not, the process in the imaging mode (S905) ends.

In step S1013, the CPU 101 controls the image processing unit 104 to draw the display switching button 401 for setting change. The drawing position is not particularly limited and can be at the left end or the right end of the position of the setting change buttons 302 drawn in step S1011.

In step S1014, the CPU 101 determines whether the detection position of the tap operation detected in step S1007 is within the touch detection region corresponding to the display switching button 401. If the position is in the touch detection region corresponding to the display switching button 401, the process proceeds to step S1015, and if not, the process proceeds to step S1016.

In step S1015, the CPU 101 controls the image processing unit 104 to switch the setting change buttons 302 displayed on the display unit 156. The switching method is not particularly limited, but the buttons displayed when the display switching button 401 is touched may be hidden, and a button other than those displayed when the switching button 401 is touched may be displayed on the display unit 156. Alternatively, one displayed button may be hidden for each tap of the display switching button 401, and one button which has not been displayed may be displayed.

In step S1016, the CPU 101 determines whether the detection position of the tap operation in step S1007 is within the touch detection region corresponding to the setting change buttons 302. If the position is in the touch detection region corresponding to any of the setting change buttons 302, the process proceeds to step S1017, and if not, the process proceeds to step S1018.

In step S1017, the CPU 101 changes the setting to the setting corresponding to the setting change button 302 detected in step S1017. For example, in FIG. 3, when the user touches "auto" in the setting change button 302, the CPU 101 sets the white balance to "auto."

In step S1018, the CPU 101 determines whether the detection position of the tap operation detected in step S1007 is within the touch detection region corresponding to the close button 303. If the position is in the touch detection region corresponding to the close button 303, the process proceeds to step S1019, and if not, the process proceeds to step S1021.

In step S1019, the CPU 101 controls the image processing unit 104 to delete the display of the button on the display unit 156 among the function selecting button 301, the setting change button 302, the close button 303, etc. Then, in step S1020, the CPU 101 controls the image processing unit 104 to display the menu button 202 and the photo button 201 on the display unit 156.

In step S1021, the CPU 101 determines whether the detection position of the tap operation detected in step S1007 is within the touch detection region corresponding to the photo button 201. If the position is in the touch detection region corresponding to the photo button 201, the process proceeds to step S1022, and if not, the process proceeds to step S1023.

In step S1022, the CPU 101 controls the imaging unit 109 and the image processing unit 104 to obtain a still image (or a moving image) and records the obtained still image on the recording medium 107.

In step S1023, the CPU 101 controls the image processing unit 104 to draw an AF frame in the detection position of the tap operation detected in step S1007. The CPU 101 also controls the imaging unit 109 to perform an AF operation so that the focus is in the range of the AF frame. Note that according to the embodiment, the AF frame is drawn to have a fixed size, and the AF operation is performed within the range, but the size of the AF frame to be drawn may be changed depending on the touch panel accuracy by the touch panel unit 150 connected to the imaging apparatus 100.

When the touch panel accuracy is low, it is assumed that the position specification of the desired location for the AF operation may be shifted due to a detection error. Therefore, the AF frame may be drawn large and the range for the AF operation may be enlarged accordingly in order to specify the AF position without awkwardness even when the touch panel accuracy is low.

<Content of Processing by Imaging Apparatus 100: Playback Mode>

Figure 11:
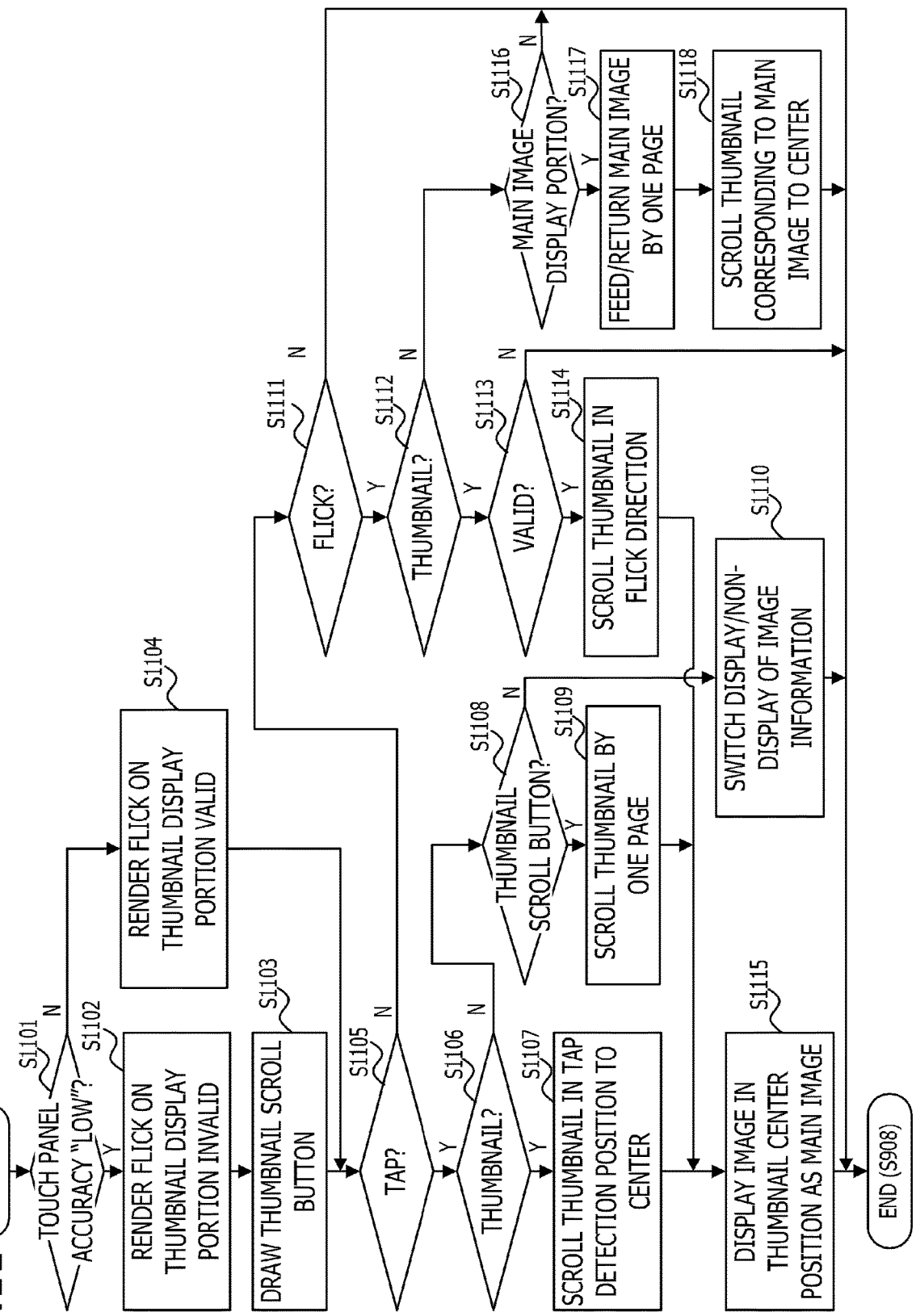
FIG. 11 is a flowchart for illustrating an example of playback mode processing according to the embodiment.

FIG. 11 is a flowchart for illustrating the flow of a series of processing steps carried out by the CPU 101 in the playback mode. In the following example according to the embodiment, the CPU 101 accepts tap and flick operations in the playback mode.

In step S1101, the CPU 101 determines whether the touch panel accuracy information received in step S902 in FIG. 9 is "low." Note that the CPU 101 may determine that the accuracy information is "low" when the touch panel position detection accuracy is lower than a predetermined threshold and that the accuracy information is "high" when the position detection accuracy is not less than the predetermined threshold. If the accuracy information is "low," the process proceeds to step S1102, and if not, the process proceeds to step S1104.

In step S1102, the CPU 101 sets a flick on the thumbnail display portion 702 to be inactive. Then, in step S1103, the CPU 101 controls the image processing unit 104 to draw a thumbnail scroll button 801. Then, the process proceeds to step S1105.

In step S1104, the CPU 101 sets a flick on the thumbnail display portion 702 to be active. Then, the process proceeds to step S1105.

In step S1105, the CPU 101 detects the presence/absence of a tap operation according to input information about the touch panel received from the touch panel unit 150. If a tap operation is detected, the process proceeds to step S1106, and if not, the process proceeds to step S1111.

In step S1106, the CPU 101 determines whether the detection position of the tap operation detected in step S1105 is on the thumbnail display portion 702. If the tap operation is on the thumbnail display portion 702, the process proceeds to step S1107, and if not, the process proceeds to step S1108.

In step S1107, the CPU 101 controls the image processing unit 104 to perform scroll control so that the thumbnail image in the position in which the tap has been detected is in the center of the thumbnail display portion 702. Then, the process proceeds to step S1115.

In step S1108, the CPU 101 determines whether the detection position of the tap operation detected in step S1105 is on the thumbnail scroll button 801. If the position is on the thumbnail scroll button 801, the process proceeds to step S1109, and if not, the process proceeds to step S1110.

In step S1109, the CPU 101 controls the image processing unit 104 to scroll by one page and display the thumbnail display portion 702. Then, the process proceeds to step S1115.

In step S1110, the CPU 101 controls the image processing unit 104 to delete the display of image information if the image information is displayed and display image information if the image information is not displayed. According to the embodiment, the image information indicates a thumbnail image, a file number, and a number display, but the information displayed on the display in the playback mode may be displayed or deleted as the image information.

In step S1111, the CPU 101 detects a flick operation according to the touch panel input information received from the touch panel unit 150. If a flick operation is detected, the process proceeds to step S1112, and if not, the process in the playback mode (S908) ends.

In step S1112, the CPU 101 determines whether the detection position of the flick operation detected in step S1111 is on the thumbnail display portion 702. If the detected position of the flick operation is on the thumbnail display portion 702, the process proceeds to step S1113, and if not, the process proceeds to step S1116.

In step S1113, the CPU 101 determines whether a flick on the thumbnail display portion 702 is set to be active. If the flick is set to be active, the process proceeds to step S1114, and if not, the process in the playback mode (S908) ends.

In step S1114, the CPU 101 controls the image processing unit 104, and performs scroll control of the thumbnail images according to the flick direction of the flick operation detected in step S1111. Then, the process proceeds to step S1115.

In step S1115, the CPU 101 controls the image processing unit 104 to display an image displayed in the center of the thumbnail display portion 702 on the main image display portion 701. Then, the processing (S908) in the playback mode ends.

In step S1116, the CPU 101 determines whether the detection position of the flick operation detected in step S1111 is on the main image display portion 701. If the position is on the main image display portion 701, the process proceeds to step S1117, and if not, the process in the playback mode (S908) ends. According to the embodiment, no processing is performed for the thumbnail scroll button 801 when a flick operation is detected, but the flick may be processed as a tap.

In step S1117, the CPU 101 controls the image processing unit 104 to feed or return the main image by one page according to the flick direction of the flick operation detected in step S1111. Then, in step S1118, the CPU 101 performs scroll control to the thumbnail display portion 702 so that that the thumbnail image corresponding to the main image displayed on the main image display portion 701 is displayed in the center. Then, the processing (S908) in the playback mode ends.

<Content of Processing by Touch Panel Unit 150>

Figure 12:
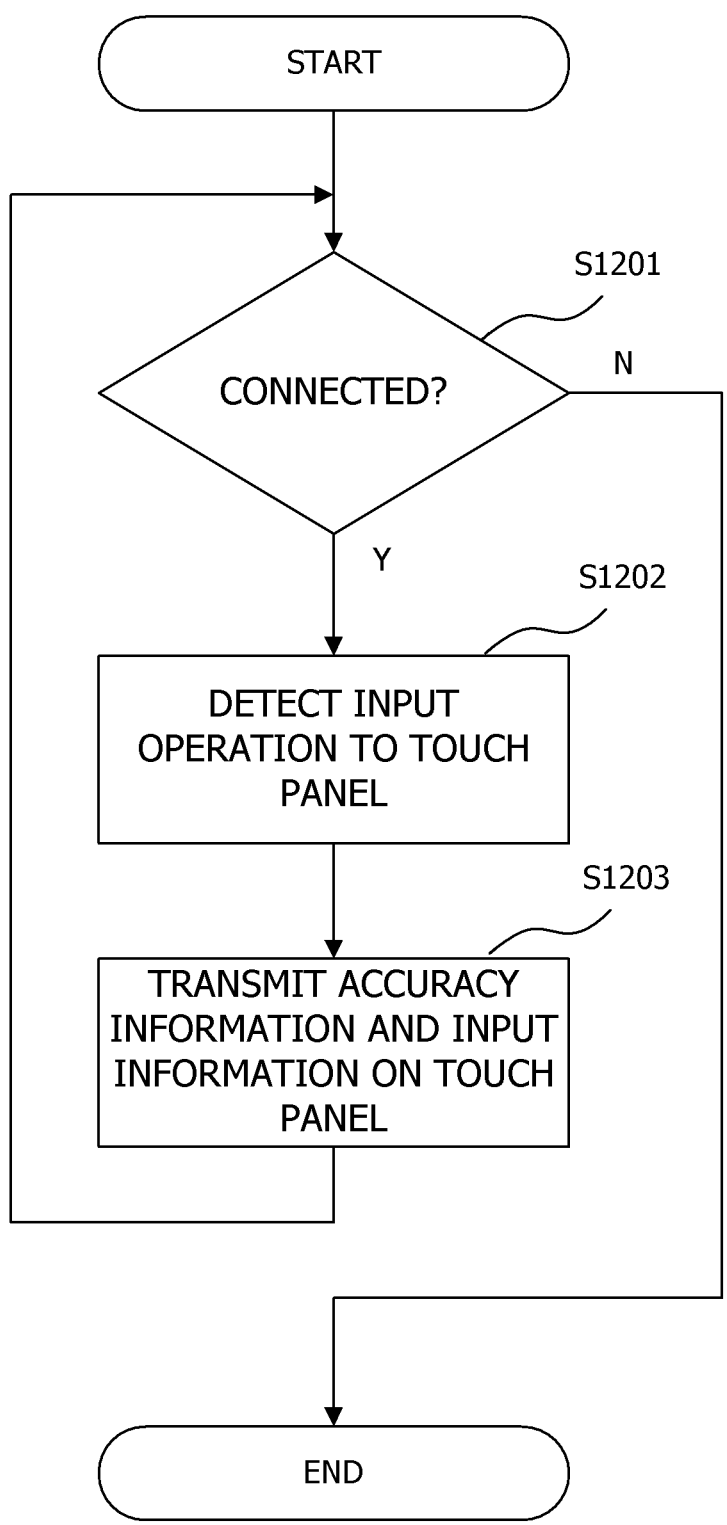
FIG. 12 is a flowchart for illustrating an example of a processing by a touch panel unit according to the embodiment.

FIG. 12 is a flowchart for illustrating the flow of a series of processing steps performed by the CPU 151 in the touch panel unit 150.

In step S1201, the CPU 151 determines whether the imaging apparatus 100 is connected to the external I/F 157. If the imaging apparatus 100 is connected, the process proceeds to step S1202, and if not, the process ends.

In step S1202, the CPU 151 detects an input operation on the touch panel by the operation unit 155. More specifically, the CPU 151 detects an input operation on the touch panel, and reads the input coordinates upon detecting the input operation, and stores the coordinates in the memory 152. Then, the process proceeds to step S1203.

In step S1203, the CPU 151 transmits touch panel accuracy information and the touch panel input information detected in step 1202 to the imaging apparatus 100 through the external I/F 157. Then, the process returns to step S1201.

Advantageous Effects of Embodiment

As described above, when the imaging apparatus according to the embodiment can be connected with a plurality of external touch panels which operate according to different touch detection methods, and an external touch panel which operates according to a touch detection method with high position detection accuracy is connected, the apparatus performs UI control focused on fine operability, and when an external touch panel which operates according to a touch detection method with low position detection accuracy is connected, the apparatus performs UI control focused on operation reliability, so that a highly convenient UI can be provided for each of the external touch panels.

<First Modification (Content of Processing by Imaging Apparatus 100)>

The content of processing carried out by the imaging apparatus 100 according to the embodiment has been described with reference to the flowcharts shown in FIGS. 9 to 11. In the following description of a modification, the imaging apparatus 100 changes a threshold used in detecting a tap or a flick according to accuracy information on the touch panel unit 150.

According to the modification, the CPU 101 detects an operation as a tap when the distance d between a touch-down position (a touch-on start position) and a touch-up position (a touch-on end position) is not more than a preset threshold $t_1$. The threshold $t_1$ can be interpreted as a maximum distance for recognizing a tap (a maximum recognition distance). When the distance d between the touch-down position and the touch-up position is greater than a preset threshold $t_2$ ($t_1 \le t_2$), the tap is detected as a flick. The threshold $t_2$ can be interpreted as a minimum distance for recognizing a flick (a minimum recognition distance).

In general, when a touch panel with low position detection accuracy is used, the distance d between the touch-down position and the touch-up position tends to increase, and it is therefore highly likely that an operation intended by the user to be a tap is mistakenly recognized as a flick. Therefore, according to the modification, when the touch panel position detection accuracy is low, the threshold $t_1$ is set larger than when the position detection accuracy is high so that a tap can be more easily recognized. The threshold $t_2$ is also set larger than when the position detection accuracy is high so that a flick becomes more difficult to be recognized. In practice, an appropriate numerical value (a threshold s) is set according to the size of the touch panel and the resolution of position detection coordinates.

Figure 13:
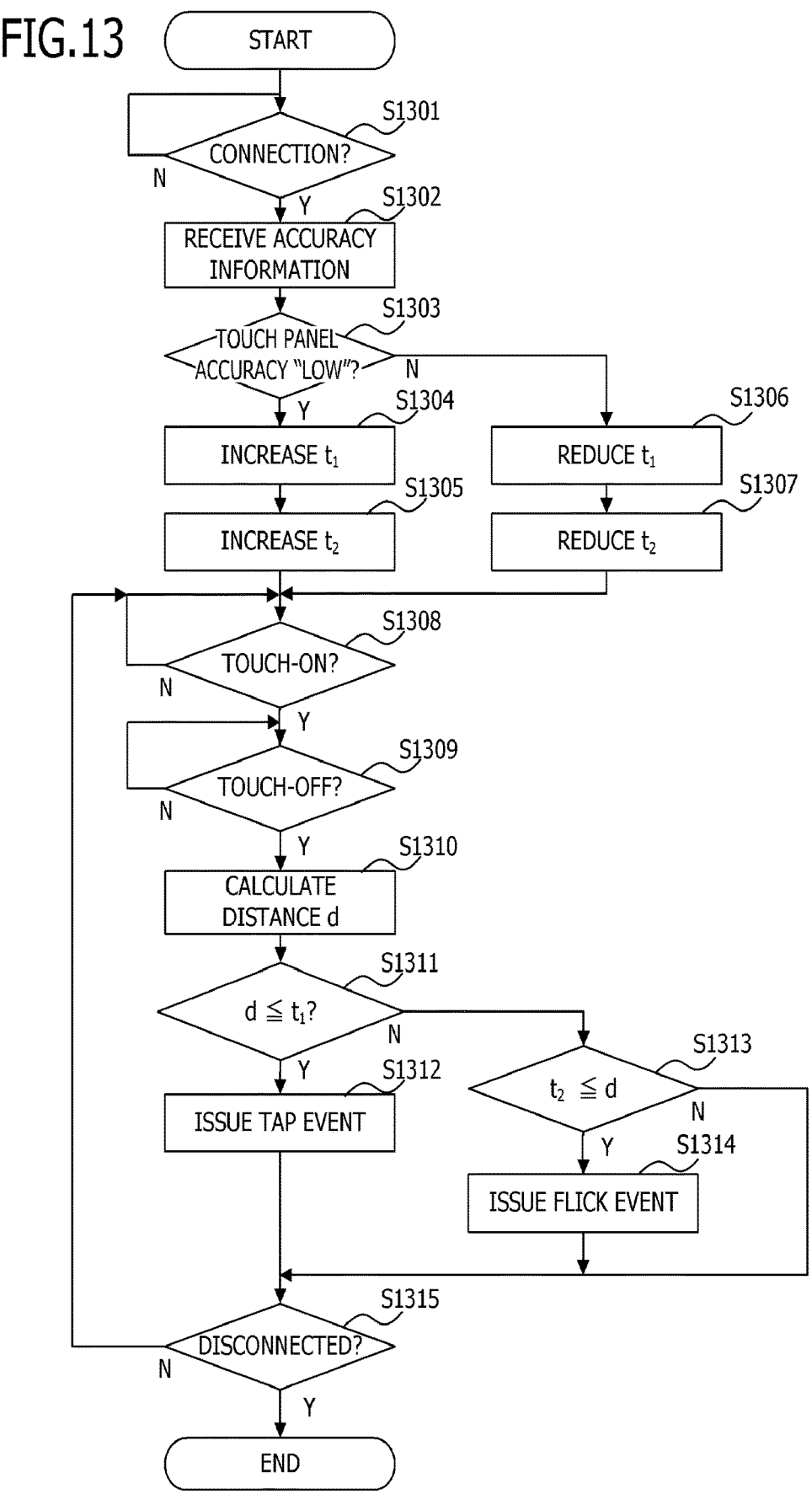
FIG. 13 is a flowchart for illustrating an example of processing according to a first modification of the embodiment.

FIG. 13 is a flowchart for illustrating the flow of a series of processing steps performed by the CPU 101 of the imaging apparatus 100 after the touch panel unit 150 is attached to the imaging apparatus 100 to perform operations in the imaging mode and the playback mode until the touch panel unit 150 is detached.

In step S1301, the CPU 101 determines whether the external I/F 157 of the touch panel unit 150 is connected to the external I/F 108. If the external I/F 157 of the touch panel unit 150 is connected to the external I/F 108, the process proceeds to step S1302, and if not, the process remains in step S1301.

In step S1302, the CPU 101 communicates with the touch panel unit 150 through the external I/F 108 and the external I/F 157 and receives accuracy information on the touch panel mounted to the touch panel unit 150. Then, the process proceeds to step S1303.

In step S1303, the CPU 101 determines whether the touch panel accuracy information received in step S1302 is "low." If the accuracy information is "low," the process proceeds to step S1304, and if not (according to the embodiment, if the accuracy information is "high"), the process proceeds to step S1306.

In step S1304, the CPU 101 sets the threshold $t_1$ larger than the initial value. Then, in step S1305, the CPU 101 sets the threshold $t_2$ larger than the initial value. Then, the process proceeds to step S1308.

In step S1306, the CPU 101 sets the threshold $t_1$ to an initial value or less. Then, in step S1307, the CPU 101 sets the threshold $t_2$ to the initial value or less. Then, the process proceeds to step S1308.

In step S1308, the CPU 101 detects touch-down from touch panel input information received from the touch panel unit 150. If touch-down is detected, the process proceeds to step S1309, and if not, the process remains in step S1308.

In step S1309, the CPU 101 detects touch-up from the touch panel input information received from the touch panel unit 150. If touch-up is detected, the process proceeds to step S1310, and if not, the process remains in step S1309.

In step S1310, the CPU 101 calculates the distanced between the touch-down detection position and the touch-up detection position. Then, the process proceeds to step S1311.

In step S1311, the CPU 101 determines whether the distance d between the touch-down position to the touch-up position calculated in step S1309 is at most equal to a threshold $t_1$. If the distance d is at most equal to the threshold $t_1$, the process proceeds to step S1312, and if not, the process proceeds to step S1313.

In step S1312, the CPU 101 issues a tap event. The tap event is issued by writing the event type and the generation coordinates in the memory 102. The written event is read out under another kind of control for determining whether a tap or a flick has been generated later. Although the flowchart shown in FIG. 13 does not indicate how the generated event is addressed, the event may be read out in the tap detection processing as in step S1007 in FIG. 10. After the issuance of the tap event, the process proceeds to step S1315.

In step S1313, the CPU 101 determines whether the distanced between the touch-down position and the touch-up position calculated in step S1310 is equal to or more than a threshold $t_2$. If the distance d is equal to or more than the threshold $t_2$, the process proceeds to step S1314, and if not, the process proceeds to step S1315.

In step S1314, the CPU 101 issues a flick event. Then, the process proceeds to step S1315.

In step S1315, the CPU 101 determines whether the external I/F 157 of the touch panel unit 150 is connected to the external I/F 108. If the touch panel unit 150 is not connected, the process ends here. If the panel is connected, the process returns to step S1308.

Note that the series of processing steps shown in the flowcharts in FIGS. 9 to 11 and the processing in FIG. 13 may be carried out separately or simultaneously.

<Second Modification (Display Example of Inactive Flick)>

According to the embodiment described above, when the position detection accuracy by the touch panel is low, a flick on the thumbnail display portion 702 is rendered inactive, and the thumbnail scroll button 801 is displayed instead but an alternative method may be carried out. For example, a tap on the thumbnail display portion 702 may be rendered inactive and a flick may be kept active.

According to the embodiment described above, a flick operation is active when the position detection accuracy by the touch panel is high, and the operation is inactive when the position detection accuracy is low. However, it is considered that a user who uses both a touch panel with high accuracy information and a touch panel with low accuracy information (by simultaneously connecting the panels to the imaging apparatus 100) may have difficulty in understanding which operation is currently active or inactive. Therefore, when the touch panel unit 150 is connected or when the operation mode of the imaging apparatus 100 is switched, an indication for the activity or inactivity of a flick may be provided.

Figure 14:
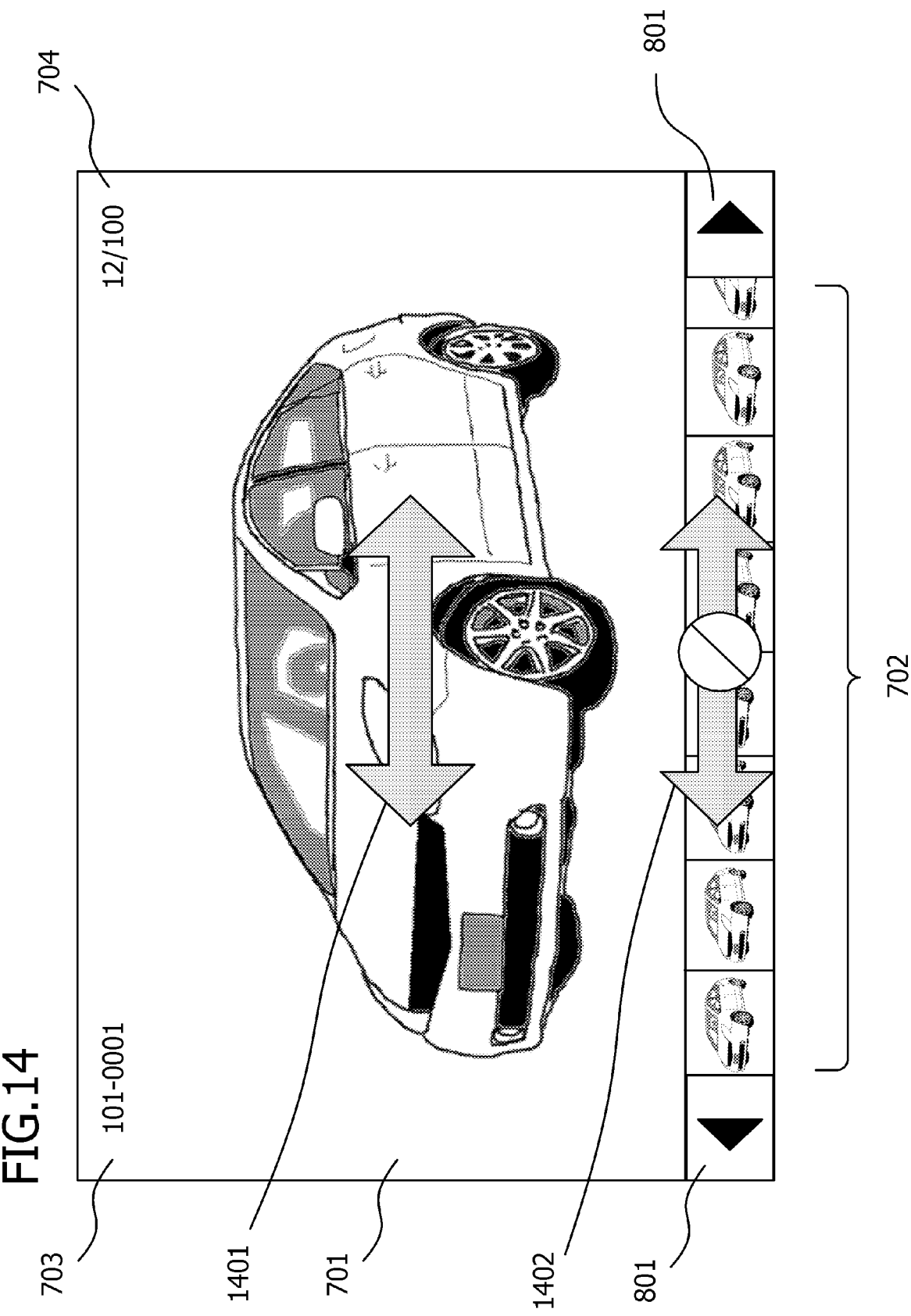
FIG. 14 is a view showing an example of a screen display according to a second modification of the embodiment.

FIG. 14 shows an example of a display indicating whether a flick is active or inactive. A flick active display 1401 indicates that the flick in the main image display portion 701 is active. A flick inactive display 1402 indicates that the flick on the thumbnail display portion 702 is inactive. The flick inactive display 1402 has a mark indicating prohibition superimposed on the flick active display 1401 to indicate that the flick is inactive. Note that accuracy information about the previously connected touch panel unit 150 may be stored in the memory 102, and the flick activity/inactivity may be indicated only when a touch panel unit 150 with different accuracy from the previous touch panel unit is connected.

<Other Modifications>

In the example according to the embodiment described above, the number of items displayed as UIs in the imaging mode is changed, the touch detection region of each item is changed, and flick activity/inactivity is switched in the playback mode, while the UI control may be performed regardless of the operation mode. Although the two operation modes have been described with reference to the imaging apparatus by way of illustration, the imaging apparatus can also be interpreted as a control apparatus that controls UIs according to position detection accuracy by a touch panel.

In the above-description of the embodiment, position detection accuracy by a touch panel is used as panel information related to a touch detection method. However, the imaging apparatus 100 may obtain method information from the touch panel unit 150 instead of obtaining the accuracy information from the touch panel unit 150. The method information may include information such as a single-layer capacitive method and a two-layer capacitive method. In general, the single-layer capacitive method has lower position detection accuracy than the two-layer capacitive method and therefore corresponds to the "low" position detection accuracy in the above-described embodiment. The two-layer capacitive method corresponds to the "high" position detection accuracy. Specifically, in steps S1001 and S1101 in FIG. 10 according to the embodiment, the imaging apparatus 100 carries out determination on the basis of the method information. More specifically, when the method information indicates the single-layer capacitive method, the process proceeds to steps S1002 and S1102, and when the method information indicates the two-layer capacitive method, the process proceeds to steps S1005 and S1104. Similarly, in step S1302 in FIG. 13, the imaging apparatus 100 obtains method information about the touch panel. If it is determined in step S1303 that the method information indicates the single-layer capacitive method, the process proceeds to step S1304, while if the method information indicates the two-layer capacitive method, the process proceeds to step S1306. In this case, in step S1203 in FIG. 12, the touch panel unit 150 transmits the touch panel method information and the touch panel input information to the imaging apparatus 100. The imaging apparatus 100 may be configured to obtain accuracy information by determining position detection accuracy by the touch panel on the basis of the method information obtained from the touch panel unit 150.

According to the embodiment, a tap and a flick have been described as an example of touch panel operations, but control such as long pressing (the time from touch-down to touch-up is a predetermined time or more) or simultaneous tapping with a plurality of fingers or pens may be performed.

For example, in a thumbnail image, the scroll amount under the scroll control may be changed according to the duration in which the thumbnail scroll button is touched.

The three kinds of UI control according to the embodiment have been described, while the control method is not limited to the above. For example, the arrangement of the buttons may be changed, and the buttons arranged horizontally in the peripheral area of the touch panel with high position detection accuracy may be arranged vertically in a touch panel with low position detection accuracy. The buttons may be displayed at intervals. The buttons may have different shapes.

According to the above embodiment, when the position detection accuracy by the touch panel is low, the number of items displayed on the UI and the display size of each item or the touch detection region is greater than when the position detection accuracy is high, while the change in the degree of UI control with respect to the position detection accuracy is not limited to the linear change. For accuracy lower than predetermined position detection accuracy (a reference value), the control value may be small, and for higher accuracy, the control value may be large. For example, step-wise change may be used. Also, multiple reference values may be provided for position detection accuracy.

According to the above embodiment, although an imaging apparatus and a touch panel unit have been described as discrete bodies (a control system), a touch panel may be provided integrally with an imaging apparatus.

Other Matters

Although the present invention has been described in detail with reference to preferred embodiments thereof, the present invention is not limited by these specific embodiments, and various modifications can be made within the scope of the present invention. Some features of the embodiments described above may be combined as appropriate.

Furthermore, according to the present invention, a software program for implementing the functions of the above embodiments may be supplied to a system or apparatus having a computer capable of executing the program directly from a recording medium or through wired/wireless communication, so that the program may be executed.

Therefore, a program code itself supplied and installed in a computer to implement the functional processing according to the present invention in the computer also implements the present invention. More specifically, the present invention also includes the computer program itself for implementing the functional processing according to the present invention.

In the case, if the program can function as the program, the form of the program may be any of an object code, a program executed by an interpreter, script data supplied to an OS, or any of other forms.

The recording medium for supplying the program may be a hard disk, a magnetic recording medium such as a magnetic tape, an optical/magneto-optical storage medium, and a non-volatile semiconductor memory. As a method for supplying the program, a computer program that forms the present invention may be stored in a server on a computer network, and a client computer connected to the network may download and program the computer program.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-104635, filed on May 31, 2018, which is hereby incorporated by reference herein in its entirety.

What is claimed is:

1. A control apparatus externally connected with a display apparatus having a touch panel, the control apparatus comprising:
   a first receiving unit configured to receive panel information, wherein the panel information is related to a touch detection method used in the touch panel from the display apparatus, and wherein the panel information includes whether the panel is one of a high position touch accuracy type and a low position touch accuracy type;
   a second receiving unit configured to receive a predetermined operation to the touch panel from the display apparatus; and
   a user interface (UI) control unit configured to control a UI used for (1) displaying an item on the display apparatus, (2) detecting the predetermined operation to the item, and (3) accepting a predetermined instruction corresponding to the detection result,
   wherein the UI control unit is further configured to carry out display control for the item or detection control for the predetermined operation to the item on the basis of the panel type.

2. The control apparatus according to claim 1, wherein the UI control unit is further configured:
   (1) to carry out control so that a part of a plurality of the predetermined operations become inactive depending on the touch detection method,
   (2) not to carry out processing in a case where inactive operation is detected, and (3) to carry out processing in response to a predetermined instruction corresponding to a detection result of detecting an active operation.

3. The control apparatus according to claim 2, wherein the UI control unit is further configured to display an image indicating whether each of the predetermined operations is active or inactive on the display apparatus, in a case where a part of the plurality of predetermined operations are active and others are inactive.

4. The control apparatus according to claim 1, wherein the predetermined operation includes at least one of a tap operation and a flick operation, (1) wherein the tap operation is touching the touch panel, releasing the touch panel within a predetermined period, and a moving distance in the operation is not more than a first threshold, (2) wherein the flick operation is touching the touch panel, releasing the touch panel within the predetermined period, and a moving distance in the operation is at least a second threshold which is equal to or more than the first threshold.

5. The control apparatus according to claim 4, wherein the UI control unit is further configured to set the first and second thresholds to be greater in a case where position detection accuracy according to the touch detection method is low than a case where the position detection accuracy is high.

6. The control apparatus according to claim 1, wherein the UI control unit is further configured to carry out control so that the number of the items displayed varies depending on the touch detection method.

7. The control apparatus according to claim 1, wherein the UI control unit is further configured to carry out control so that the size of the item displayed varies depending on the touch detection method.

8. The control apparatus according to claim 1, wherein the UI control unit is further configured to carry out control so that a detection range for the predetermined operation to the item varies depending on the touch detection method.

9. The control apparatus according to claim 1, wherein the touch detection method corresponds to the number of sensor layers for detecting capacitance.

10. The control apparatus according to claim 1, wherein position detection accuracy varies depending on the touch detection method.

11. The control apparatus according to claim 1, wherein the UI control unit is further configured to carry out the display control or the detection control to an item displayed in a peripheral area of the touch panel.

12. A control method of control apparatus externally connected with a display apparatus having a touch panel, the control method comprising:

receiving panel information, wherein the panel information is related to a touch detection method used in the touch panel from the display apparatus, and wherein the panel information includes whether the panel is one of a high position touch accuracy type and a low position touch accuracy type;

receiving a predetermined operation to the touch panel from the display apparatus;

controlling a UI used for (1) displaying an item on the display apparatus, (2) detecting the predetermined operation to the item, and (3) accepting a predetermined instruction corresponding to the detection result, and carrying out display control for the item or detection control for the predetermined operation to the item on the basis of the panel type.

13. A non-transitory computer readable medium that stores a program, wherein the program causes a computer to execute: a control method of control apparatus externally connected with a display apparatus having a touch panel, the control method comprising:

receiving panel information, wherein the panel information is related to a touch detection method used in the touch panel from the display apparatus, and wherein the panel information includes whether the panel is one of a high position touch accuracy type and a low position touch accuracy type;

receiving a predetermined operation to the touch panel from the display apparatus;

controlling a UI used for (1) displaying an item on the display apparatus, (2) detecting the predetermined operation to the item, and (3) accepting a predetermined instruction corresponding to the detection result; and carrying out display control for the item or detection control for the predetermined operation to the item on the basis of the panel type.

* * * * *